July 29, 1941.  R. L. MULLER  2,250,837
CALCULATING MACHINE
Filed Sept. 14, 1935   17 Sheets-Sheet 1

INVENTOR
Robert L. Muller
BY
Davis, Macauley, May, Lindsay, & Smith
ATTORNEYS

July 29, 1941. R. L. MULLER 2,250,837
CALCULATING MACHINE
Filed Sept. 14, 1935 17 Sheets-Sheet 3

INVENTOR
Robert L. Muller
BY
ATTORNEYS

July 29, 1941.  R. L. MULLER  2,250,837
CALCULATING MACHINE
Filed Sept. 14, 1935   17 Sheets-Sheet 4
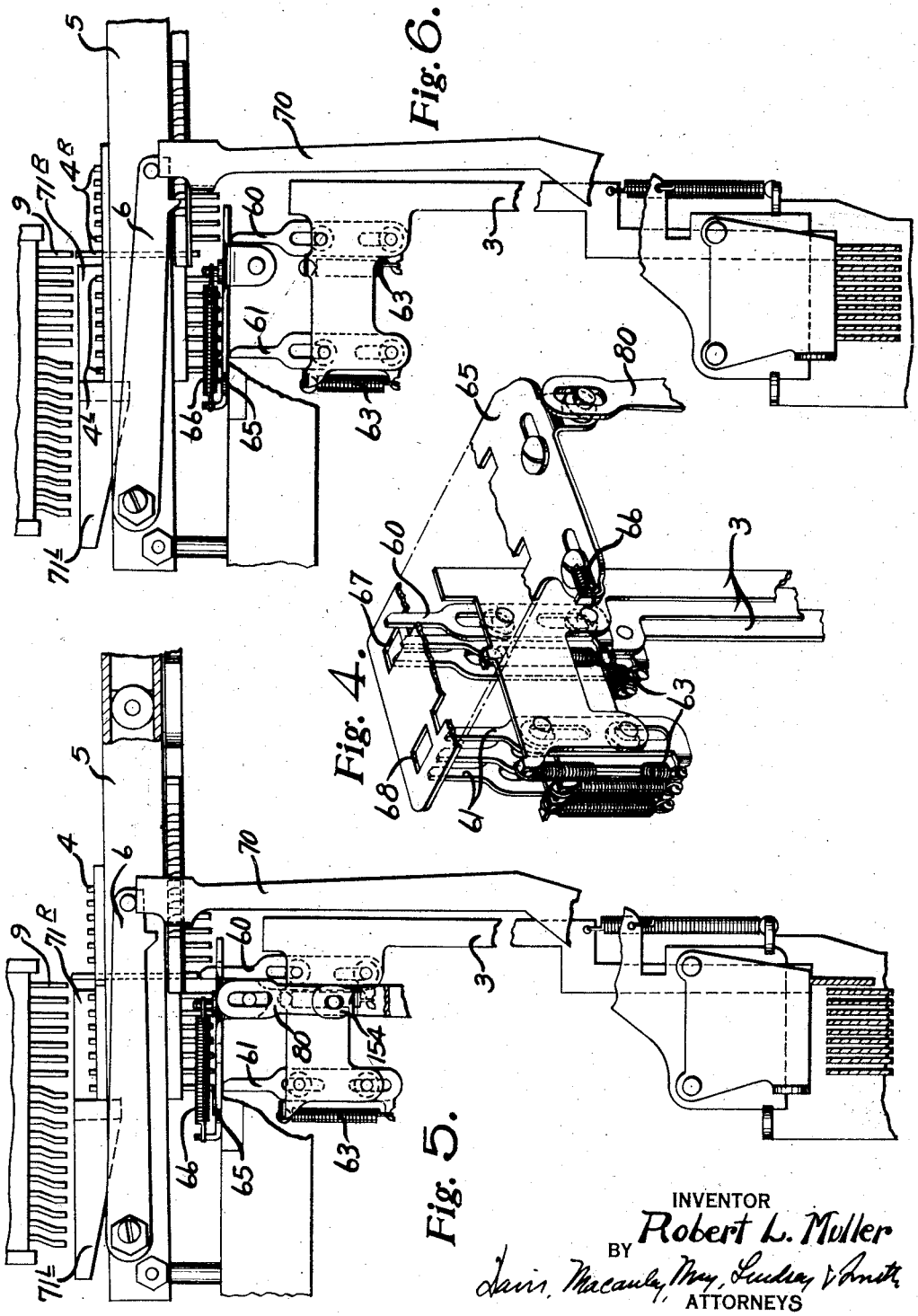
INVENTOR
Robert L. Muller
BY
ATTORNEYS July 29, 1941.  R. L. MULLER  2,250,837
CALCULATING MACHINE
Filed Sept. 14, 1935   17 Sheets-Sheet 5
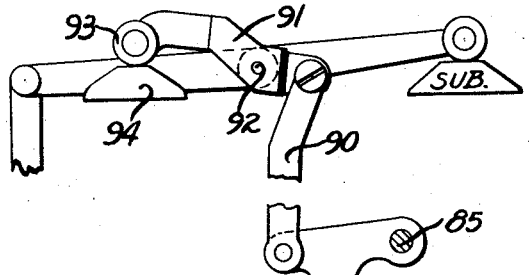
Fig. 7.
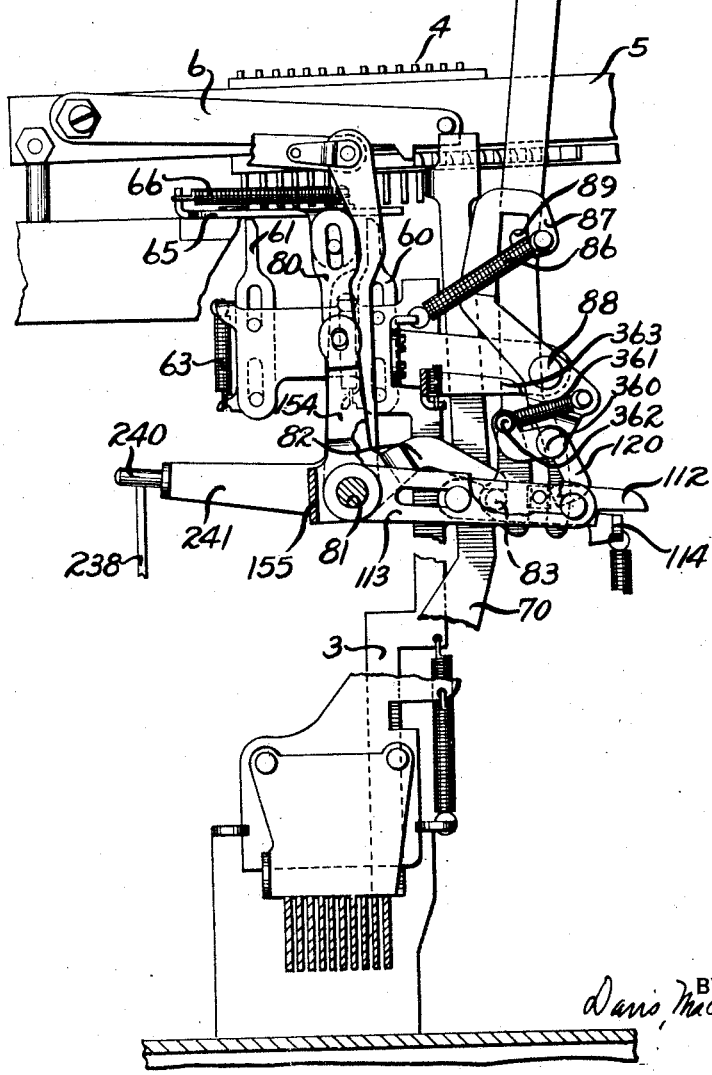
INVENTOR
Robert L. Muller
BY
ATTORNEYS

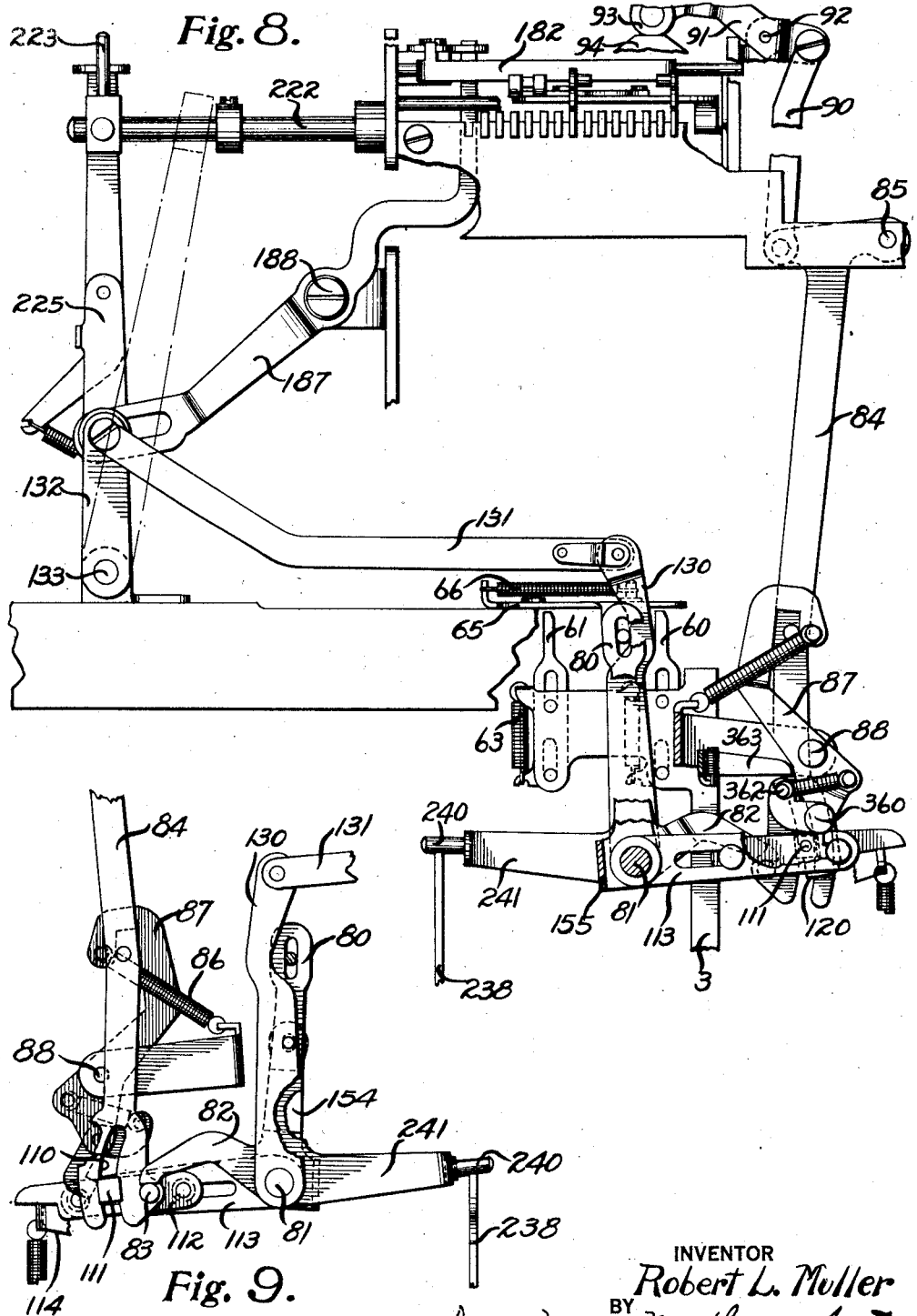

July 29, 1941.   R. L. MULLER   2,250,837
CALCULATING MACHINE
Filed Sept. 14, 1935   17 Sheets—Sheet 7

INVENTOR
Robert L. Muller
BY
Davis, Macauley, May, Lindsey & Smith
ATTORNEYS

July 29, 1941.  R. L. MULLER  2,250,837
CALCULATING MACHINE
Filed Sept. 14, 1935   17 Sheets-Sheet 8

INVENTOR
Robert L. Muller
BY
ATTORNEYS

July 29, 1941.   R. L. MULLER   2,250,83?
CALCULATING MACHINE
Filed Sept. 14, 1935   17 Sheets-Sheet 10
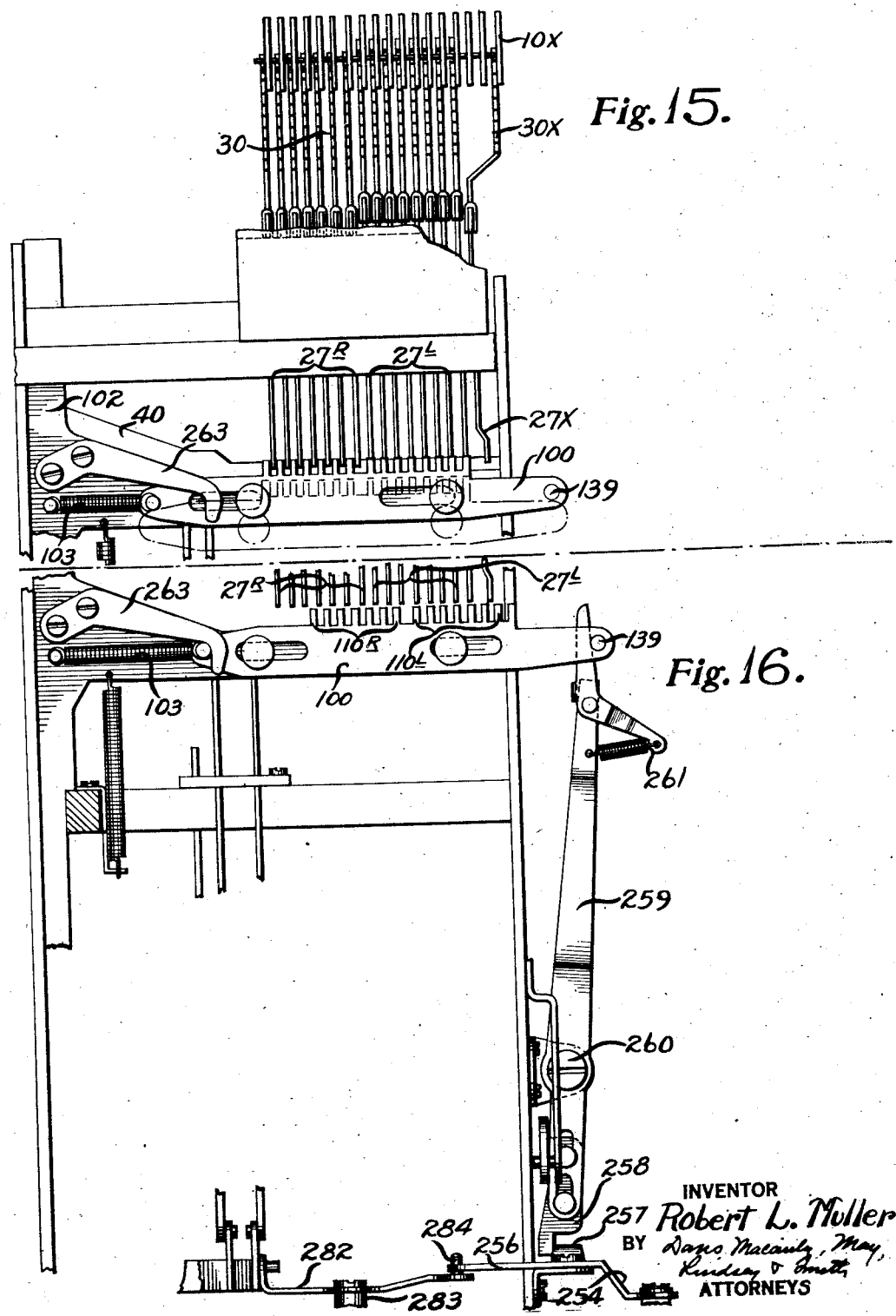

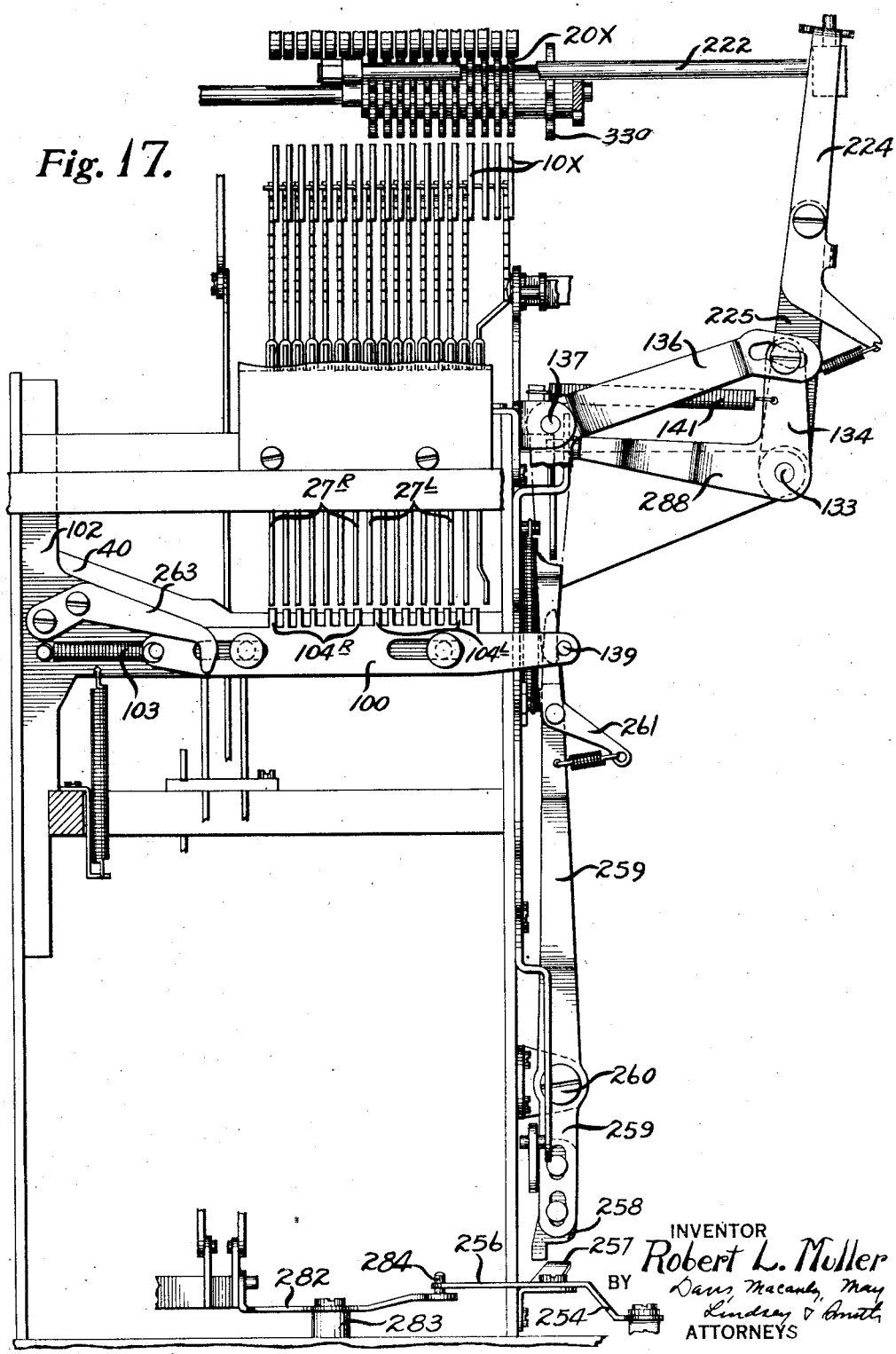

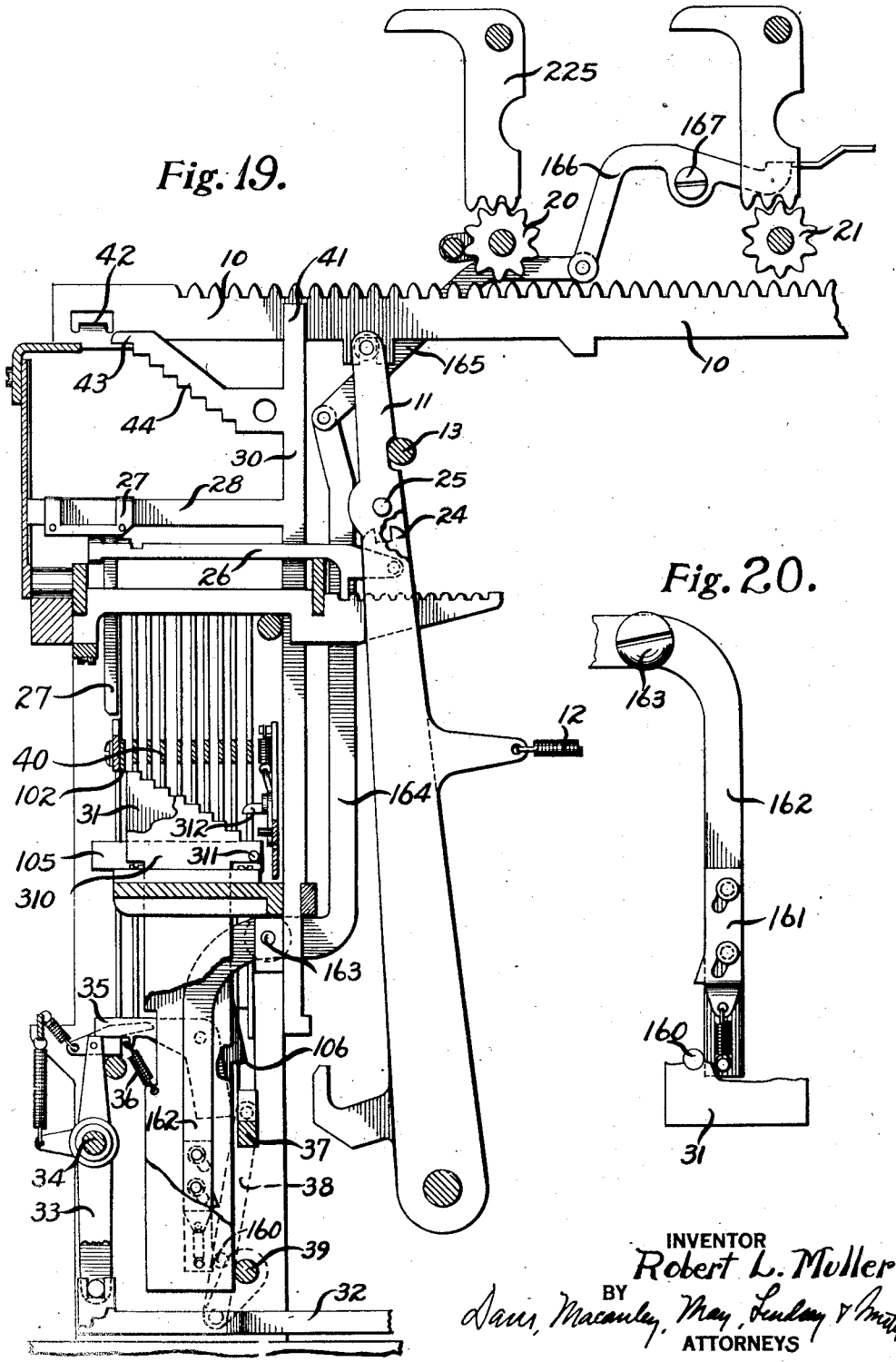

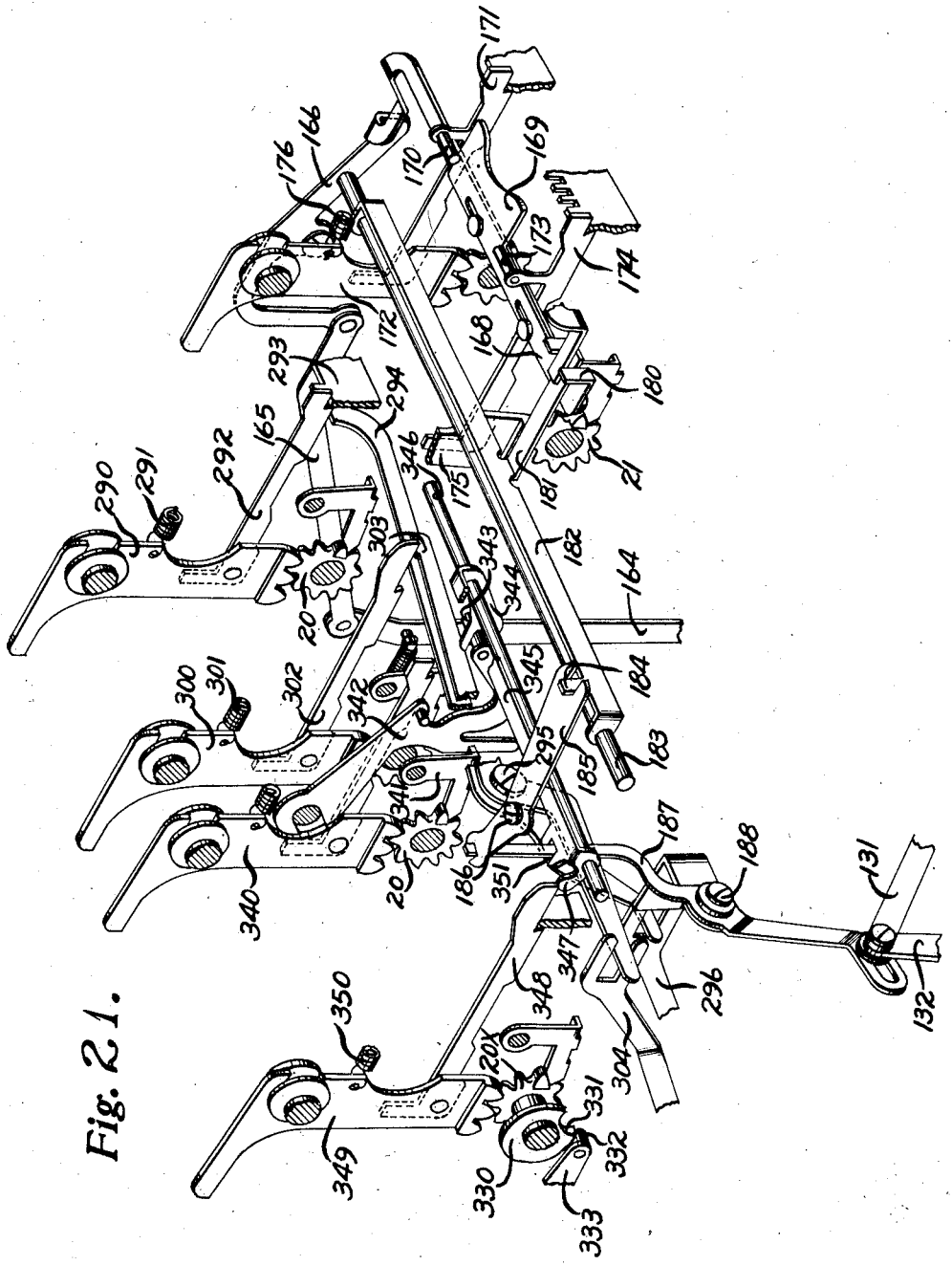

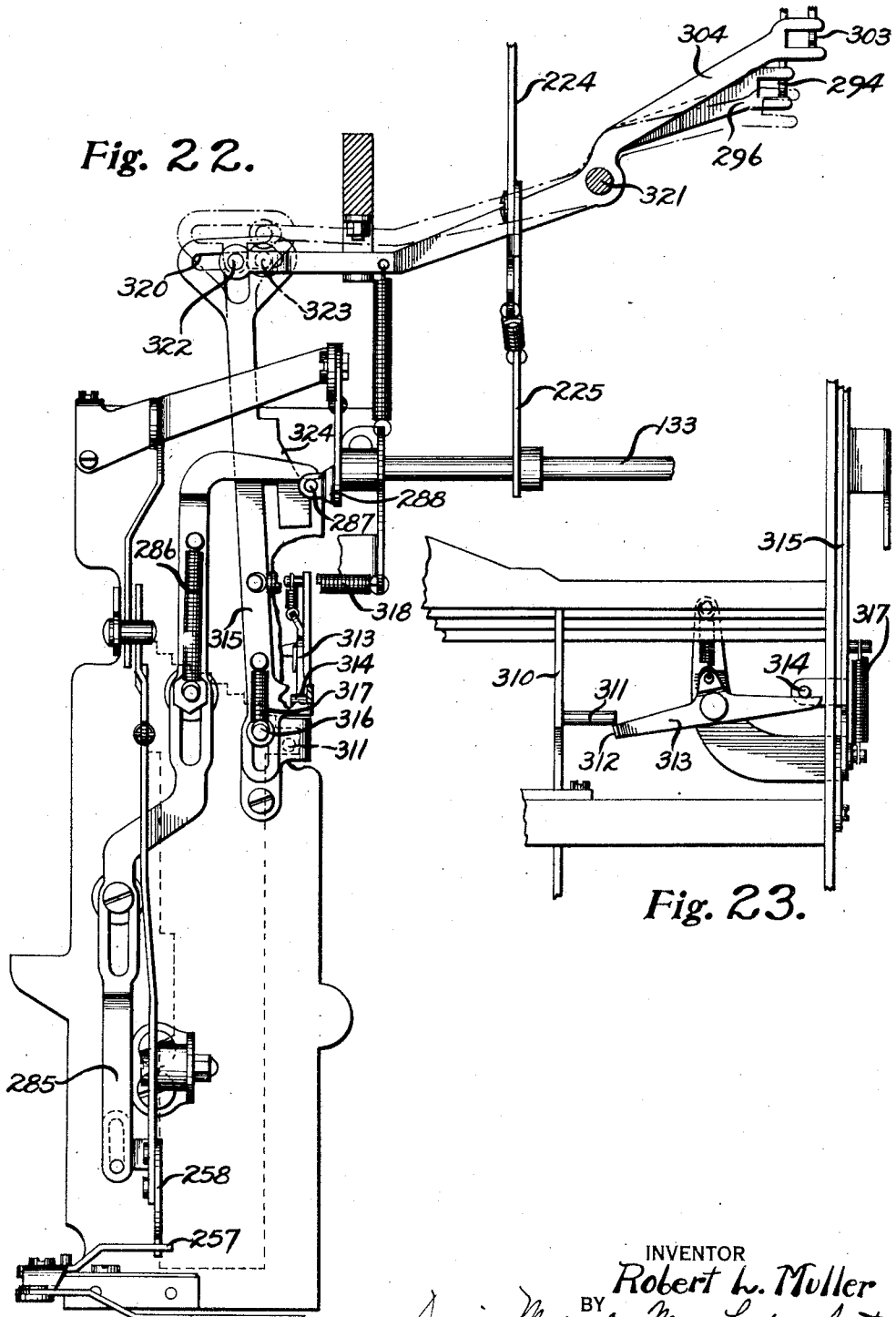

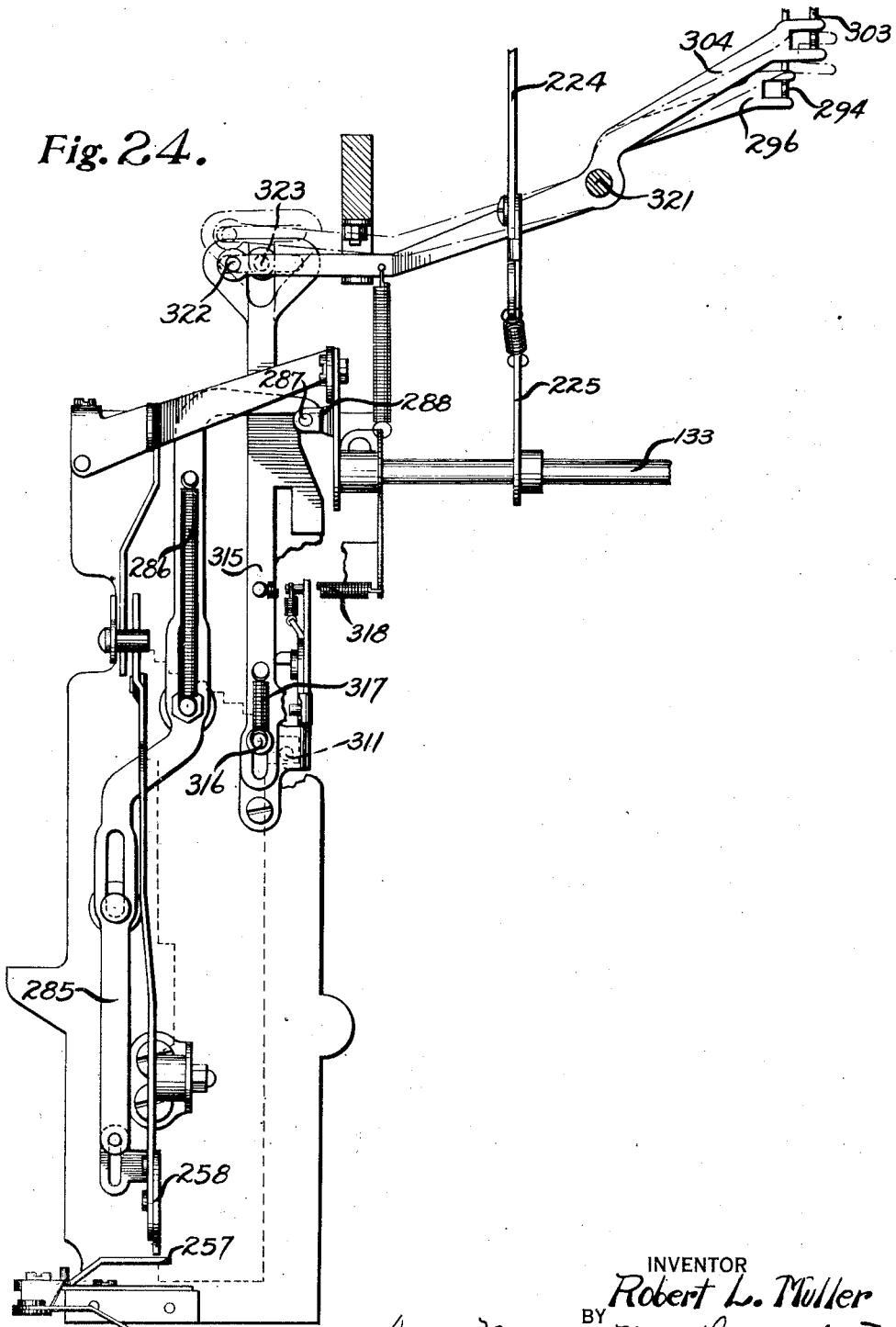

July 29, 1941.   R. L. MULLER   2,250,837
CALCULATING MACHINE
Filed Sept. 14, 1935   17 Sheets-Sheet 17

INVENTOR
Robert L. Muller
BY Davis, Macauley, May, Lindsey, & Smith
ATTORNEYS

Patented July 29, 1941

2,250,837

UNITED STATES PATENT OFFICE 2,250,837

CALCULATING MACHINE

Robert L. Muller, Detroit, Mich., assignor to Burroughs Adding Machine Company, Detroit, Mich., a corporation of Michigan Application September 14, 1935, Serial No. 40,599

66 Claims. (Cl. 235—60)

This invention relates to a calculating machine. It is directed particularly to the problem of increasing the register capacity of a multiple register calculating machine without increasing the size of said machine.

The principal object of the invention is to provide an improved multiple register calculating machine.

Another object is to provide a calculating machine in which subtraction may be performed in each of a large number of registers.

Another object is to provide a machine in which a negative total may be obtained from each of a large number of registers.

Other and more particular objects of the invention will appear from the following specification and drawings.

An embodiment of the invention is shown in the drawings, in which:

Fig. 4 is a perspective view of the pin control plate for certain of the index pins, said plate being shown in its right hand position with a pin indexed by a key depression.

Fig. 5 is a partial front elevation with the parts in condition for operation in the right hand section of the machine and with one of the amount keys depressed.

Fig. 6 is a view similar to Fig. 5 after an amount key has been depressed and released.

Fig. 7 is a partial front elevation showing the carriage controls in the position they occupy to enter amounts in the left hand section of the machine before a cycle of machine operation.

Fig. 8 is a view similar to Fig. 7 with the parts in the position they occupy during a cycle of machine operation.

Fig. 9 is a partial detailed rear elevation of a portion of the mechanism shown in Fig. 7.

Fig. 15 is a partial view similar to Fig. 14 showing the parts in the position they occupy during a cycle of machine operation.

Fig. 16 is a partial rear elevation with the parts in the position they occupy for taking a total from the rear register, or for performing a subtract operation with the rear register in its right hand position.

Fig. 17 is a partial rear elevation with the parts in the position they occupy for operating in the left hand section of the machine.

Fig. 19 is a partial left side elevation with some of the parts omitted to show the front and rear subtract mechanisms.

Fig. 20 is a detail view in right side elevation of one of the parts shown in Fig. 19.

Fig. 21 is a separated perspective showing the double "extra 1" mechanism in both the front and rear registers and certain portions of the negative total mechanism for the rear register.

Fig. 22 is a partial left side elevation of the double "extra 1" mechanism for the rear register, with the parts in the position they occupy when the rear register is in its right hand position.

Fig. 23 is a partial rear elevation of the "extra 1" mechanism for the rear register with the parts in the position they occupy at the end of a subtract operation with the subtract plate restored to normal and just at the time an "extra 1" is to be entered.

Fig. 24 is a view similar to Fig. 22 with the parts in the position they occupy when the register is in its left hand position.

Figure 1:
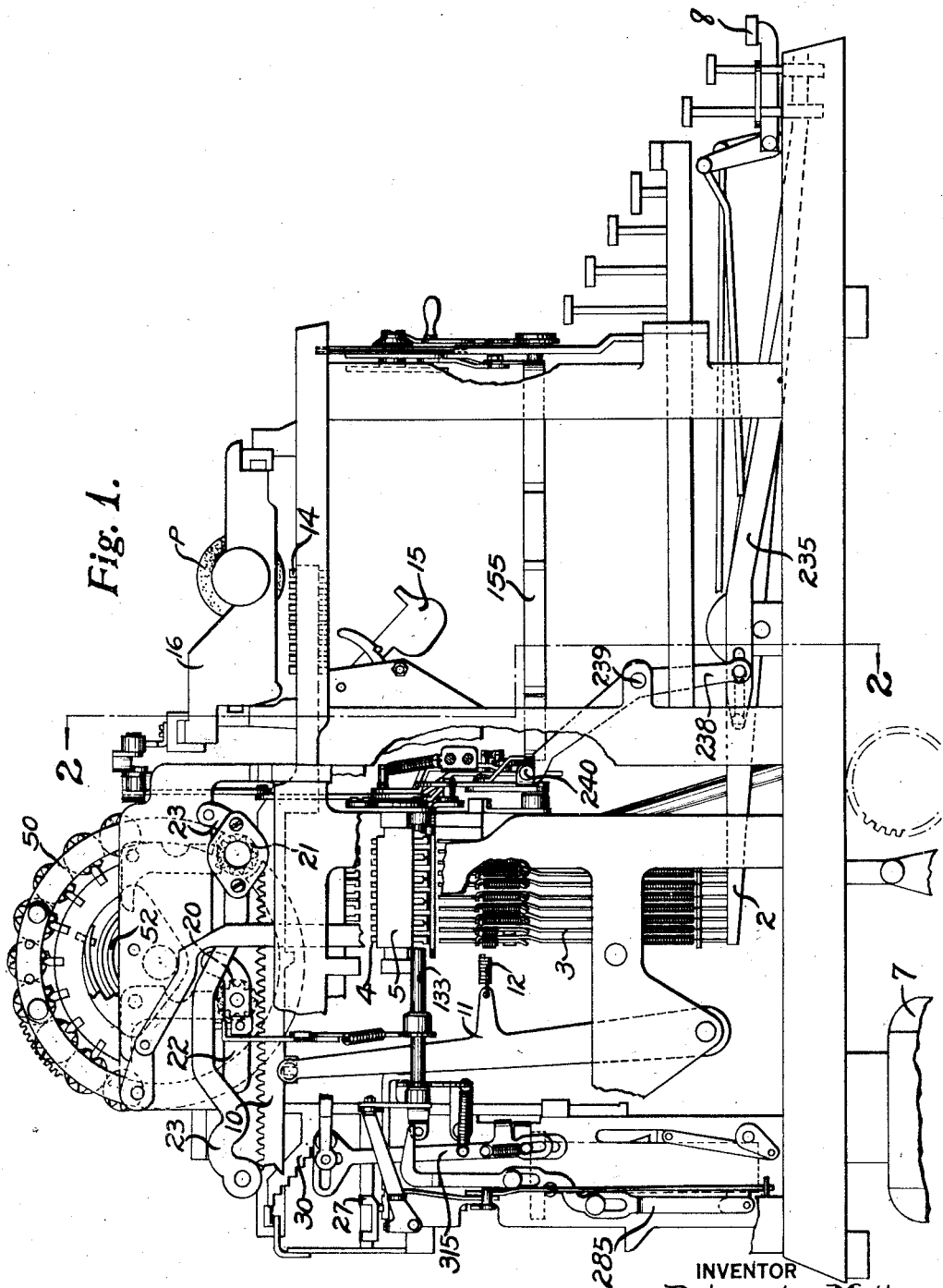
Figure 1 is a left side elevation of the machine with the casing removed and some of the parts omitted to show others more clearly.

The invention is shown applied to a Burroughs calculating machine of the type sometimes called the Burroughs-Moon-Hopkins machine. The general features of this machine are shown in Hopkins Patent No. 1,336,904, and in numerous other patents covering improvements that have been made from time to time. Only such features of the machine will be described in this application as are necessary for an understanding of the present invention. It is to be understood that while the invention is shown as applied to this machine it can also be used with other types of calculating machines.

General Machine Features

The machine, which is of the ten key type, has ten amount keys 1 (Fig. 13) each of which operates a lever 2 (Fig. 1) to thrust its index bar 3 upwardly when the key is depressed. The index bars index pins 4 in a traveling pin carriage 5 which is controlled by an escapement mechanism 6 (Fig. 3) that is released for one step of movement each time a key is depressed. After an item has been indexed in the pin carriage, the machine is give a cycle of operation by hand, or by a motor 7 (Fig. 1) set into operation by a motor bar 8. During this cycle, the pin carriage 5 is raised upwardly to cause the indexed pins to engage corresponding pins in a stationary field of stop pins 9 to index the latter in positions to arrest the actuators 10, which are in the form of racks in differential positions. The actuator racks 10 are carried by arms 11 (Fig. 19) urged forward by springs 12. The racks are held in normal position by a bail 13 but, when the machine is given a cycle of operation, the bail releases the arms 11 which then move forward until arrested in differential positions by the stop pins 9 in the stationary field of stops. The keys and their connections form what may be called amount receiving devices, and the sets of index pins form indexing mechanisms. The amount receiving devices together with the indexing mechanisms and the actuator racks form what may be called an amount determining differential mechanism.

The actuator racks carry movable types 14 (Fig. 1) on their front ends and, after the racks have been differentially positioned, a printing mechanism, including the hammers 15, is automatically operated to print the amount indexed by the racks.

Figure 11:
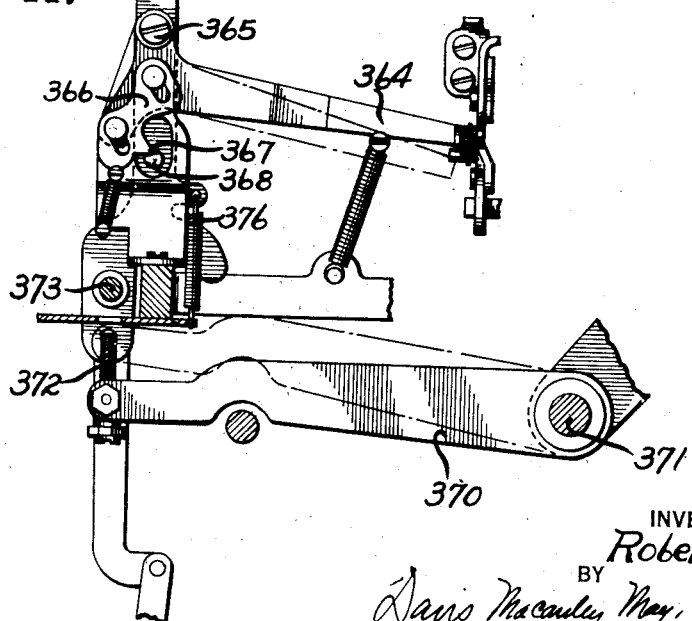
Fig. 11 is a partial right side elevation showing the delayed release mechanism.

Paper supporting means is provided including a platen P. Means is provided for controlling the columnar printing, that is, for causing different amounts, or calculations, to be printed in different columns on the paper that is supported in the machine. In the embodiment illustrated, the platen is mounted on a traveling paper carriage 16 which is movable from column to column across the machine under the control of a tabulating mechanism, a portion of which is shown at 17 in Figs. 2 and 11, said mechanism being described in detail in Thieme Patent No. 1,259,929. The traveling paper carriage is automatically returned across the machine by a carriage return mechanism, a portion of which, 18, is shown in Fig. 11.

A rear or main register 20 is adapted to cooperate with the actuator racks 10 and the present machine is provided with a large number of front, or multiple, registers 21 as will be later explained. The rear register is carried by a rockable frame 22 which may be moved at predetermined times during cycles of operation of the machine to engage and disengage the register and racks. The mechanism for rocking the frame has not been shown but is described in detail in said Hopkins patent and in Thieme 1,321,260. The multiple registers 21 are movable into a front frame 23 which may also be rocked to engage and disengage the indexed register and racks. The means for doing this has not been shown as it is described in Muller 1,920,477.

A suitable tens-transfer mechanism is provided for each register. This mechanism has not been illustrated in detail, although the transfer segments are shown in Fig. 1 and other parts are illustrated in some of the other figures.

Addition is performed by moving the rear, or the front, or both registers into engagement with the actuator racks after the latter have been differentially positioned. As the racks are returned to normal the amount indexed on them is entered on the register or registers that are in engagement with them.

Subtraction is performed by a process of complemental addition in a manner described in Hopkins Patents Nos. 1,206,113 and 1,336,904, but which will be briefly explained here as the mechanism is used in the present invention. When an item is to be subtracted, it is entered on the amount keys and an "extend" key is depressed which causes the machine to be given a cycle of operation. In the present machine the key "Cr. Reg." (Fig. 13) performs the function of an "extend" key.

Referring to Fig. 19, the actuator racks 10 are, as previously explained, carried by arms 11 urged clockwise by springs 12. Positioned adjacent each arm 11 is an auxiliary arm 24 having a notch in its upper end adapted, under certain conditions, to engage over a stud 25 on the adjacent arm 11. The supplementary arms 24 are each connected by a link 26 to a pendant 27 slidably mounted on an arm 28 on a stop member, or bar, 30.

When the machine is conditioned for "extending," the supplementary arms 24 are raised so that their notched ends straddle the studs 25. As the machine is given a cycle of operation, the arms 11 move the actuator racks 10 forward to differential positions determined by depressed amount keys. As arms 11 move forward they carry the arms 24 with them and the latter thus differentially position the pendants 27. In extending operations the racks 10 in the orders above the indexed amount are block, hence, these higher order racks do not move out of their "0" positions.

It follows that, during the first machine cycle of an "extend" operation, the amount indexed on the keyboard will cause the pendants 27 to be differentially positioned in the orders corresponding to the indexed amount. The registers are not engaged with the racks during this operation.

Figure 13:
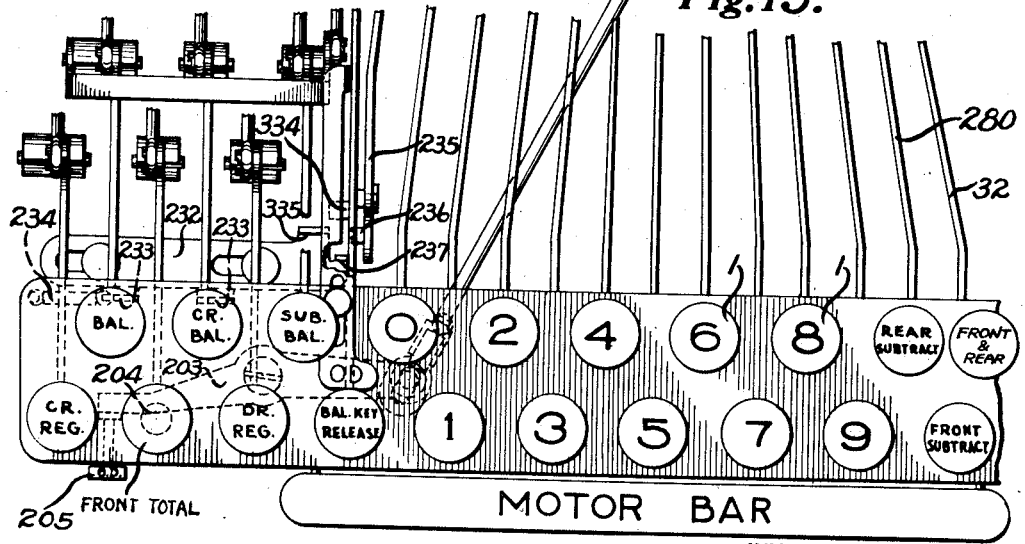
Fig. 13 is a partial plan view of the keyboard.

A subtract key, as, for example, the key "front subtract," Fig. 13, is then depressed to give the machine a second cycle of operation. During this cycle the register from which the item is to be subtracted is rocked into engagement with the racks as in addition operations, that is, it is engaged with the racks after the latter have been differentially positioned. The amount indexed on the racks is entered in the register during the return of racks.

At the beginning of the second cycle of operation a stepped subtract plate 31 (Fig. 19) is raised but, before explaining the result of this movement, the manner in which the plate is raised will be explained. There is one of these plates for both the front and rear registers in the present machine, but only one will be explained.

When the machine is conditioned for subtraction, as by depression of the key "front subtract" (Fig. 13), a bar 32 (Figs. 13 and 19) is moved forward. The rear end of bar 32 is connected to one end of a lever 33 pivoted at 34 and normally positioned under the end of a pawl 35 urged counterclockwise, as viewed in Fig. 19, by a spring 36. The pawl 35 is carried by the subtract plate 31 and its nose is normally out of the path of a bail 37. The bail 37 is connected by a link 38 to a crank fixed on a shaft 39 that is rocked clockwise and returned counterclockwise during each cycle of operation of the machine. The bail is raised very early in the cycle.

Depression of the subtract key moves bar 32 forwardly and rocks the lever 33 out from under the pawl 35 which is thereupon rocked so that its nose projects into the path of bail 37. Then, as the bail is raised during the machine cycle, it engages the pawl 35 and moves the subtract plate 31 upward.

The stepped subtract plate engages a series of laterally extending arms 40 (Figs. 19 and 14) over which the pendants 27 may be positioned. It will be apparent from this that when the subtract plate is raised, the pendants 27 in the different orders will be raised different amounts depending on how the pendants have been indexed. Since the pendants are connected to the stop members 30, the latter will be raised to differential positions.

Each stop member 30 has a projection 41 which, when the stop member is not raised, serves to limit the forward movement of its adjacent actuator rack 10 in the "9" position. This occurs when the lateral lug 42 on the rack strikes the projection 41. Each stop member 30 also has a zero stop, or abutment, 43 which, when the member 30 is raised slightly, moves into the path of lug 42 to prevent movement of the actuator racks. Each stop member 30 also has a series of stepped shoulders 44 which, when the member is raised, arrest the adjacent actuator rack in differential positions depending on how high the member is raised. These steps are arranged complementally with respect to the steps of subtract plate 31. For example, if one of the pendants 27 is moved six steps forward, it will be positioned over the sixth step of the plate 31. The range of upward movement of plate 31 is nine steps. With the pendant 27 indexed over the sixth step, the pendant will not be engaged until the plate 31 has moved six steps, which leaves only three remaining steps for moving stop 30. In other words, when a pendant 27 is indexed in its "6" position, the corresponding stop member 30 will be indexed, during operation of the machine, in its "3" position.

During the second cycle of machine operation in subtraction, the traveling pin carriage 5 is not raised, the means for raising it being disabled when the subtract key is depressed as described in Hopkins Patent No. 1,206,113, so that no pins 9 are set. When the actuator racks 10 move forward they are differentially positioned by the stop members 30 so that the racks contain the complement of the number that was entered on the amount keys. In orders above the orders of the amount indexed, the pendants are not raised and the racks move forward to their "9" positions, the racks being arrested by the projections 41. The register is then rocked into engagement with the racks and the latter are returned to normal which results in adding into the register the difference between the amount which was to be subtracted and the largest amount which the register is capable of registering, said largest amount being in every case equal to $10^n-1$, where $n$ is the number of numeral orders in the register. Where the amount to be subtracted is $x$, the amount which the actuators 10 under the control of the stop members 30 will add into the register will be $10^n-1-x$.

In performing subtraction by the process of adding the complement of the number to be subtracted, the complement which must be added in order to get the same result as would be obtained by direct subtraction of the number $x$ is, as is well known, the number equal to $10^n-x$. The amount $10^n-1-x$ which the actuators 10 under the control of the stop members 30 add into the register is "1" too small to give the correct result which would be obtained by adding $10^n-x$. Therefore, further means has been provided which, in every operation in which subtraction is performed by causing the racks 10 to add into a register the amount determined by the stop members 30 as above described under control of a subtraction plate 31 and pendants 27, adds an extra "1" into the units order of the register to complete the complement of the number to be subtracted. This further means is referred to above and hereinafter as the "extra 1" mechanism, for convenience, and will be described in detail later on.

The printing mechanism is suitably controlled to prevent the amount added into the register from being printed during the second cycle of machine operation in performing subtraction, reference being made to said Hopkins patents for details.

Totals may be taken from either register by engaging the selected register with the racks and then releasing the racks to allow them to move forward until limited in differential positions by the registers. The printing mechanism is then operated to print the total, after which the register is rocked out of engagement with the racks and the latter are returned to normal. The register is thus cleared and the racks are restored to position for another operation.

A true negative total may be taken from the rear register by a series of transfer operations. For example, if the register goes negative, the amount actually in the register is a positive total that is the complement of the true negative total. The rear total key "Bal." and a control key, called the "extend" key, and which is the "Cr. Reg." key herein, is depressed and the machine given a cycle of operation which results in transferring this complement to the pendants at the rear of the machine. This complement of the true total is then "converted" into the complement of the complement, or the true total, and transferred additively to one of the registers, for example, the rear, or main register, by depressing the "rear subtract" key and giving the machine a cycle of operation. The latter register then contains the true negative total. The machine is given a third cycle of operation by depressing the "rear total" key to take the true negative total from the register. The machine can be caused to go through these cycles of operation automatically upon the depression of a credit balance key "Cr. Bal." (Fig. 13) that conditions the machine for and causes three successive cycles of operation.

Suitable control keys are provided for conditioning the machine for subtraction; for taking totals from the front or rear register; for taking sub-totals; for transferring totals from one register to the other; for taking negative totals, and for other purposes. All of these control keys have not been shown, but certain of them pertinent to the present case have been illustrated and will be presently described.

Certain automatic controls are also provided which are conditioned by the paper carriage. Not all of these have been illustrated in the present case, but certain of them have been shown, as will later appear.

In the description that follows there will be frequent occasion to refer to the right and left hand sides or sections of the machine and, in order to avoid repetition, it is to be understood that, unless otherwise specified, this refers to the right and left hand sections, viewing the machine from the front.

For the purposes of this application the rear register will be referred to as the main register. In the trade, a register of this type is sometimes called a "crossfooter."

Multiple registers

The present invention provides for a large number of front, or multiple, registers 21, forty being shown.

These registers are contained in a relatively narrow magazine or support 50 (Fig. 2) which is rotatably mounted at the side of the group of actuator racks 10. The magazine may be indexed, as will be presently explained, to bring the desired register to indexed position, after which the register is removed from the magazine to the front register frame 23 where it is in position for cooperation with the actuator racks. This frame is rocked to engage and disengage the register with the racks to perform the various calculating operations possible on the machine.

The magazine 50 has only twenty sets of register pinions and only twenty index positions. In order to provide for forty registers, each set of register pinions 21 is divided into right and left hand groups 21—R and 21—L (Fig. 3) so that, in effect, each group of pinions comprises two registers.

After the magazine is indexed, depression of an amount key, or depression of a front total key, causes the indexed set of register pinions to be immediately transferred from the magazine to the frame. After an item has been entered in the selected register, or after a total has been taken, the set of register pinions is returned to the magazine automatically and prior to the next cycle of machine operation. Provision is made for keeping the register pinions in the frame if repeated operations in the same register are desired.

The mounting of the multiple registers, and the mechanism for removing them from and for returning them to the magazine are described in detail in Muller No. 1,920,477. Portions of these mechanisms have been illustrated herein at 51 (Fig. 3) but no attempt will be made to describe them.

The manner in which the registers combine with and are controlled in combination with the rest of the machine will be later described.

Indexing the multiple registers

The rotary register magazine is indexed automatically under the control of the paper carriage, or by means of a key.

Figure 2:
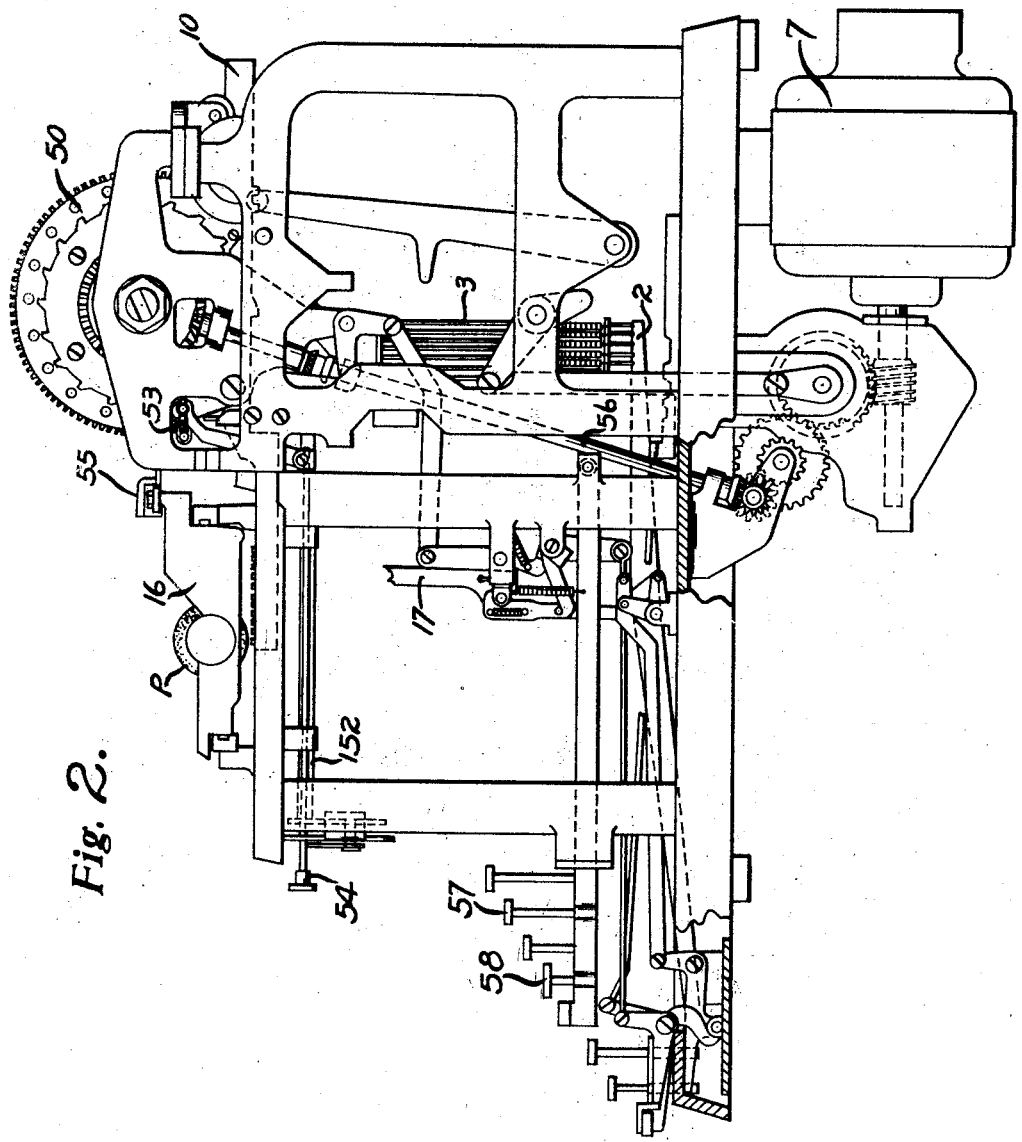
Fig. 2 is a right side elevation and partial section of the machine.

The magazine 50 is urged counterclockwise as viewed in Fig. 1 by a spring 52. It is controlled by an escapement mechanism of which a portion 53 is shown in Fig. 2. This escapement mechanism may be manually controlled by a register indexing key 54 (Fig. 12), or it may be automatically controlled by the paper carriage 16 through suitable connections, some of which are shown at 55 in Fig. 2. When the escapement mechanism is released by the carriage, the magazine is indexed automatically as the carriage moves from column to column. When the escapement is controlled by the key it can be released to allow the magazine to move from normal position to any of its index positions.

The magazine may be returned to normal by power derived from the motor 7 through connections including the shaft 56 (Fig. 2). The return is controlled by a return key 57, or it also may be set into operation by the carriage return key 58. When the paper carriage 16 is returned by depressing the carriage return key, the register magazine 50 is returned by power independently of the carriage, but returned to normal. The register magazine may also be returned toward normal and stopped in any position by depressing a register return key 57 which causes the register to be returned in a continuous manner until the key is released.

A detailed explanation of the indexing mechanism and the return mechanism is contained in Muller 1,920,477.

Means for indexing amounts in the indexing mechanisms

In the present machine, two registers, that is, a set of pinions comprising right and left hand groups, are indexed at the same time. When a given set of pinions is indexed, and after it is moved into frame 23 over the actuator racks, both the right and the left hand registers are in position for cooperation with the racks. But, although two registers are indexed, an amount entered on the amount keys will be accumulated in only one register, and both a manual and an automatic control have been provided for determining in which register the amount shall be entered. This gives rise to a number of problems which are solved by the various mechanisms hereinafter described.

The first problem is to index the amount in the appropriate section of the stationary field of stops 9 so that the appropriate actuator racks 10 can be differentially positioned.

Figure 3:
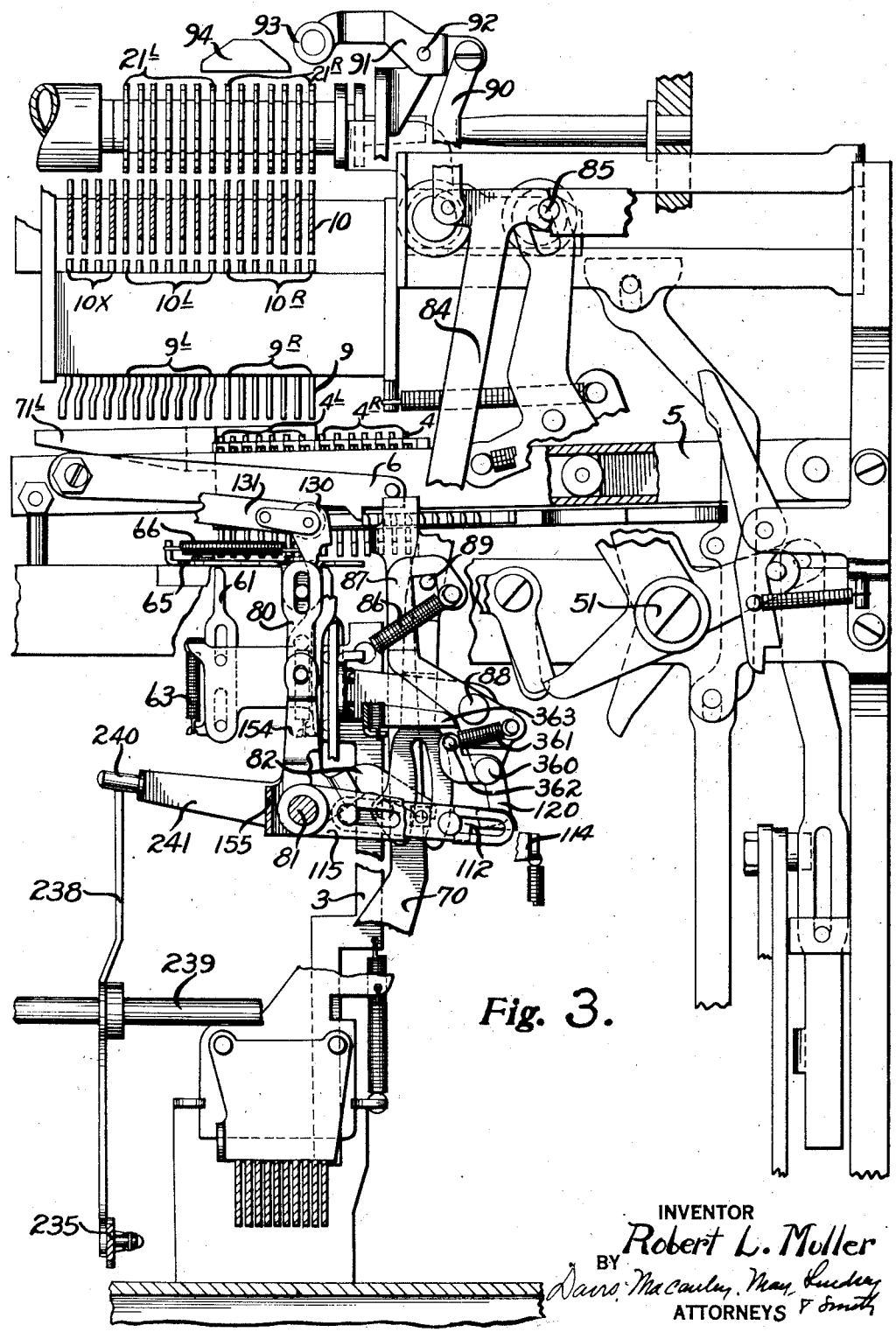
Fig. 3 is a front sectional elevation on the line 2—2 of Fig. 1 with the parts in position to enter amounts in the right hand side of the machine, viewing the machine from the front.

Referring to Fig. 3, the pins 4 of the traveling pin carriage 5 are divided into two groups 4R and 4L, each of which has seven rows of pins. The index bars 3 which are thrust upwardly by depression of the amount keys are arranged to engage the pins of either section under conditions that will presently appear. The upper end of each thrust bar 3 is widened, and slidably and yieldingly mounted on these widened ends are two thrust pins 60 and 61 (Fig. 4) the pins being urged upward by springs 63. The thrust pin 60 is adapted to engage the right hand group of pins 4R and the pin 61 is adapted to engage the left hand group 4L. The mounting of these thrust pins enables them to yield if they encounter an obstruction, while the index bar 3 can continue its upward movement.

The pins 9 in the stationary field of stops are also divided into two sections, namely, 9R and 9L (Fig. 3).

Likewise the actuator racks 10 are divided into two sections 10R and 10L (Fig. 3). These racks cooperate with the right and left hand sections 21R and 21L of the register pinions that are positioned for cooperation with the racks. It will be observed that there are four extra racks on the left hand side of the group of racks, the purpose of which will appear later.

From the above it will be clear that means is provided for indexing an amount in the right hand or in the left hand sections of the machine; that the indexing mechanism, after being indexed, controls the movements of the right and left hand groups of actuator racks; and that the racks, in turn, control the right and left hand groups of register pinions. The control of the right and left hand sections is selective and the mechanism for automatically controlling the selection will now be explained.

*Automatic control of indexing in right and left hand sections*

Amounts are not indexed in both sections at the same time and an automatic control is provided for selectively determining in which section of the machine an amount shall be indexed.

A wide plate 65, best shown in Fig. 4, is slidably mounted just below the pin carriage 5 and above the thrust pins 60 and 61. This plate is urged to the right, as viewed in Fig. 3, by a spring 66. It has one series, or set, of openings 67 for registration with the thrust pins 60, and another set 68 adapted to register with the thrust pins 61. These two sets of openings are offset slightly so that, when one set is positioned for registration with its group of thrust pins, the other set is out of registration with its group. In other words, in one position of the plate 65, the thrust pins 60 are free to move upward through openings in the plate as in Fig. 4, and, in the other position of the plate, the thrust pins 61 are free to move upward. When an index bar 3 is moved upward, one pin will move through an opening and the other will engage plate 65 and move on its yielding mounting.

Control of which side of the indexing mechanism shall be indexed is determined by controlling the position of plate 65. An automatic control is provided such that, when the machine is arranged to print in a certain column on the paper, that is, when the paper carriage is in a predetermined column, the plate 65 is in position to index one side of the machine, and when the machine is conditioned to print in another column on the paper, the plate 65 is positioned to index in the other side. In the embodiment shown, the column printing is controlled by the position of the paper carriage 16 and hence the control of the plate 65 is placed under the control of said paper carriage.

The normal position of the plate 65 is its right hand position as shown in Fig. 4 where the openings 67 permit the thrust pins 60 of the right hand set of indexing bars to pass through the plate. When the amount keys are depressed, the pins 60 are projected through the openings 67 and the pins 4R in the right hand side of the pin carriage will be indexed.

Figure 18:
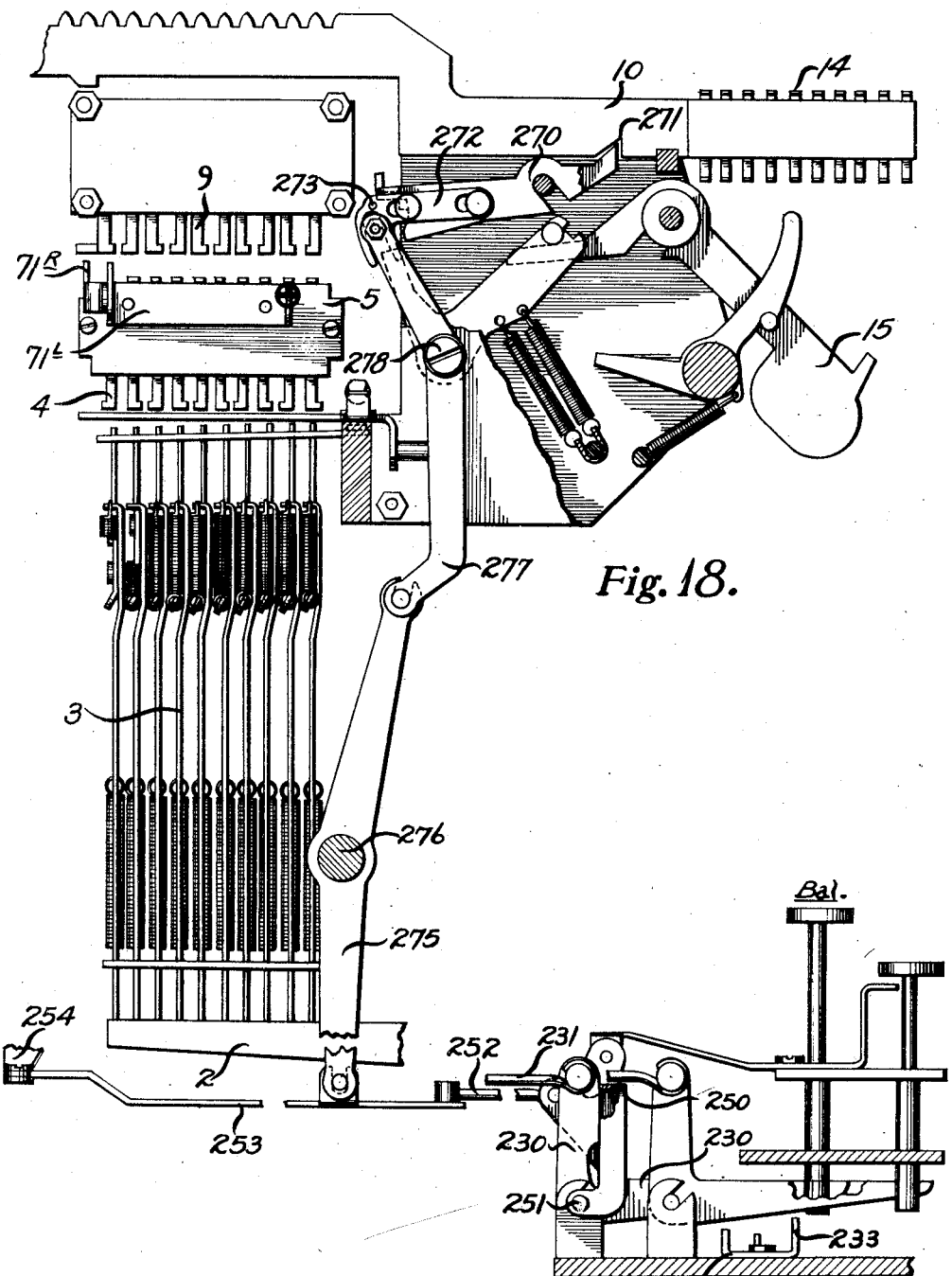
Fig. 18 is a partial left side elevation with some of the parts omitted to show the printing mechanism, particularly the cipher split and the coupling device between certain columns.

Each time an amount key is depressed and a pin set up in the pin carriage, the latter moves one step to the left as viewed in Figs. 5 and 6. This step is controlled by an escapement mechanism actuated by the upward movement of a slide 70, the escapement mechanism being described in Patent No. 1,336,904. After a key has been depressed and released, the carriage will occupy a position such as illustrated in Fig. 6, where the left hand index pin of the group 4R is directly under the corresponding right hand pin of the group 9R of stationary field of stops. If the pin carriage 5 were raised under these conditions, the right hand pin of group 9R would be raised, that is, the pin in the units row of the stationary field of stops would be indexed. But no pins would be projected in the other rows of group 9R, with the result that there would be nothing to block the forward movement of the racks 10 in the orders above the units order. It is accordingly necessary to set up zero stops in all the rows above the indexed rows and, in doing this, it must be kept in mind that, in the present case, the pins in carriage 5 are divided into two sections 4R and 4L. Two blades 71R and 71L (Figs. 5 and 18) are provided which travel with the pin carriage 5, the blade 71R being under the "0" pins of the right hand set 9R and the blade 71L being under the "0" pins of the left hand set 9L. These two blades are offset slightly as shown in Fig. 18 so that they will not interfere with one another and so that each will operate only for the pins of its set. Since these blades move to the left with the pin carriage, it will be understood that, as the pin carriage moves to the left, the blades clear their respective "0" pins one after the other from right to left. If the amount set up does not project pins in all the rows of a given set, then, when the pin carriage 5 is raised, the blades will project "0" pins in the stationary field of stops 9 in the rows above the indexed amount so as to block movement of the actuator racks in these higher order rows.

The blade 71L for the left hand section also serves to set up "0" pins in the stationary field of stops for blocking the extra four rack bars on the left during all "adding" or "listing" operations in the front registers.

Coming, now, to the automatic control of indexing, and referring to Fig. 3, the plate 65 has a pin and slot connection with one arm 80 of a bell crank lever pivoted loosely on a shaft 81. The other arm 82 of this lever extends to the right where it is positioned over a stud 83 (Fig. 9) carried by a vertical lever 84 pivoted at 85, to a frame member. The lever 84 is urged clockwise as viewed in Fig. 3 by a spring 86 connected to a lever 87 pivoted at 88 and engaging over a stud 89 on lever 84. The lever 84 is connected at its upper end by a link 90 to one end of a lever 91 pivoted at 92 to the frame of the machine and carrying a roller 93 on its outer end which is positioned to be engaged by a cam 94 on the traveling paper carriage.

In the normal position of the parts shown in Fig. 3, the carriage cam 94 is not in contact with the roller 93 and the lever 84 occupies the position shown. In this position of the parts, the plate 65 assumes its normal right hand position where amounts entered on the keyboard will be indexed in the right hand section of the machine.

When the paper carriage moves to a columnar position where the cam 94 engages roller 93, as shown in Fig. 7, the lever 84 is rocked clockwise which causes stud 83 to cam the bell crank lever 80—82 counterclockwise (Fig. 3), thereby moving the plate 65 from its right to its left hand position where thrust pins 61 are free but the pins 60 blocked. In this position of plate 65, amounts entered on the keyboard will be indexed in the left hand section of the machine.

From the description thus far given it will be understood that an automatic control has been provided for determining whether an amount entered on the amount keys will be indexed in the right or left section of the machine.

While the mechanism just described provides for indexing an amount in the right or left hand section of the machine, it is still necessary to automatically control the rack bars so that, when the machine is given a cycle of operation with an amount indexed in the right hand section, the rack bars in the left hand section will not move and, vice versa, when an amount is indexed in the left hand section, the rack bars in the right hand section will not move.

Figure 14:
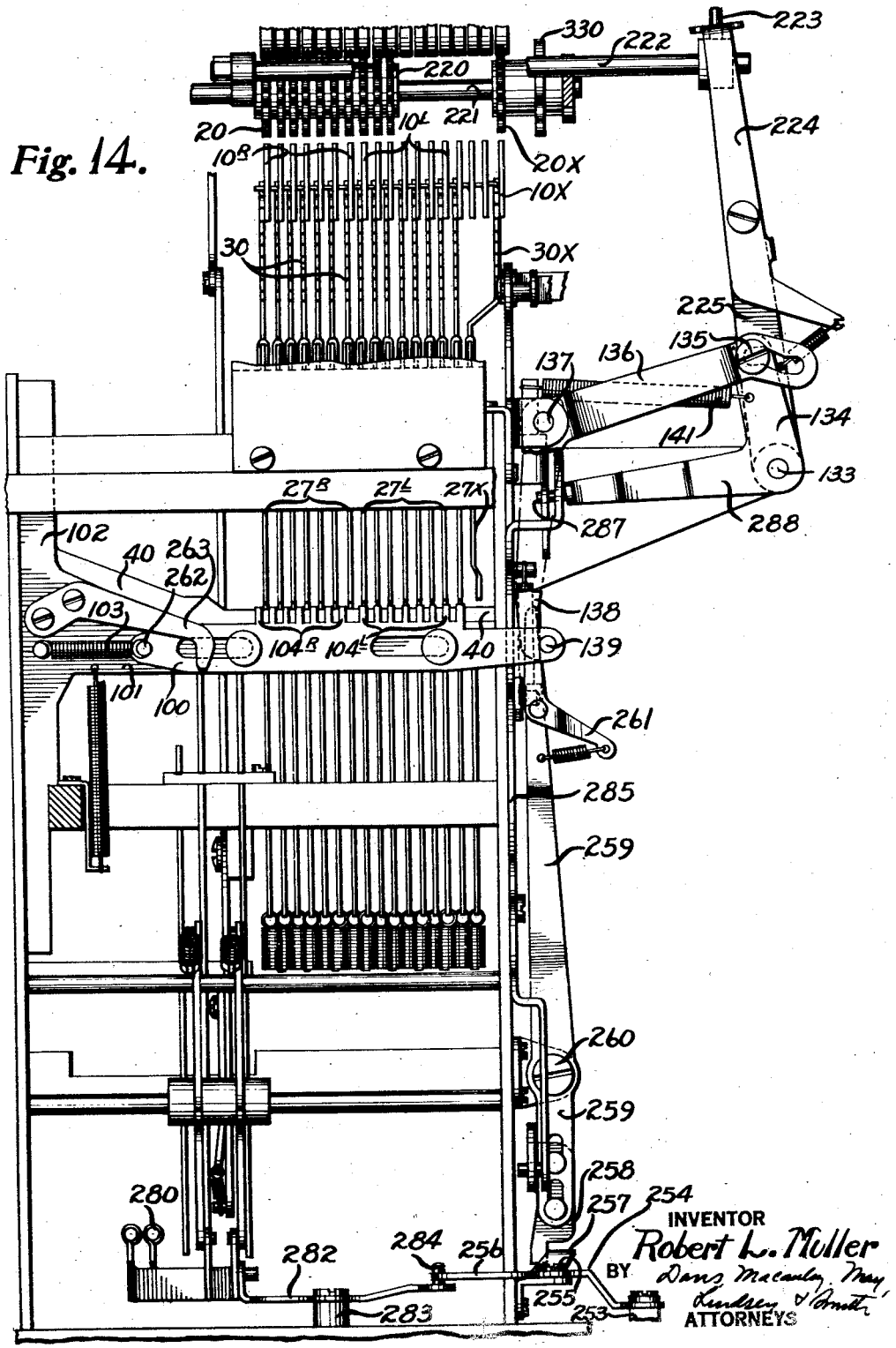
Fig. 14 is a partial rear elevation with the controls set to enter amounts in the right-hand section of the machine and with the left-hand section blocked against movement, the parts being shown in the position they occupy just before a cycle of machine operation.

Use is made of the pendants 27 at the rear of the machine to selectively control the rack bars 10. Referring to Fig. 14, the pendants are divided into right and left hand groups 27R and 27L. Immediately below the pendants is a comb plate 100 slidably mounted by a pin and slot connection on a vertically movable arm 101 of a vertical slide 102. The comb plate 100 is urged to the left, as viewed in Fig. 14, by a spring 103. This comb plate has a right hand group of projecting teeth 104R and a left hand group 104L. When the plate occupies its normal position shown in Fig. 14, the right hand teeth 104R are below and between the right hand group of pendants 27R but the teeth of the left hand group 104L are immediately below the left group of pendants 27L.

Provision is made for moving the comb plate upwardly just far enough to raise the pendants to a position to raise certain stop members 30 so that their zero stops 43 will block the rack bars.

Referring to Fig. 19, the member 102 on which the comb plate is mounted, is positioned over the upper end of a vertically movable plate 105. This plate has a shoulder 106 projecting to the path of the bail 37 which, as previously explained, is raised early in the cycle of each machine operation and then returned to normal. As the bail moves upward, it engages the shoulder 106 of the plate 105 and raises the plate. This plate moves upward and, during the latter part of its movement, engages the member 102 and raises the latter just enough to raise the comb plate 100 far enough to raise the selected stop bars 30 to position for blocking the rack bars 10.

It is to be noted that the bail 37 is raised during each cycle of operation of the machine and that, accordingly, one group of rack bars will always be blocked. In the normal position of the parts where items entered on the keys are indexed in the right hand side of the machine, the left hand group of rack bars will be blocked not only during item entering operations, but during total taking operations, as in Fig. 15.

Referring to Fig. 14, it will be apparent that the question of whether the right or left hand group of rack bars is blocked against movement depends upon the lateral position of the comb plate 100. When it is in the normal position shown in Fig. 14, the left hand group of rack bars will be blocked. But, if the comb plate is moved slightly to the right before it is raised, as shown in Fig. 17, the right hand group of rack bars will be blocked while the left hand group will be free for movement. Provision is made for automatically controlling the lateral position of the comb plate 100.

Referring to Fig. 9, the lower end of lever 84, which moves from left to right (Fig. 9) under the control of the paper carriage, has an arcuate slot 110 in which is positioned a stud 111 carried by a slide 112 mounted on an arm 113 fixed to the shaft 81. The normal position of the slide 112 is shown in Fig. 3 where it will be observed that it is out of the path of a lug on an arm 114.

But, when the lever 84 is moved from its Fig. 3 to its Fig. 7 position, as occurs when a carriage cam 94 engages the roller 93, as hereinbefore described, the slide 112 is moved over the lug on arm 114 as shown in Figs. 8 and 9.

Figure 10:
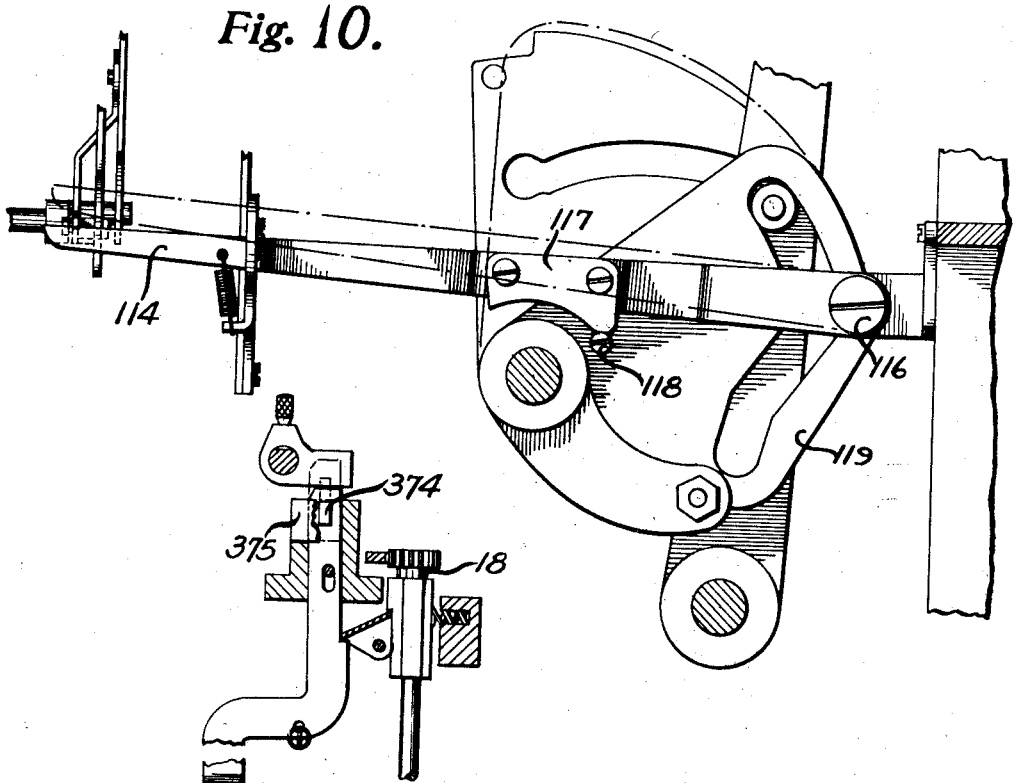
Fig. 10 is a detail right side elevation showing the power operated means for conditioning the left hand section of the machine, the parts being in the position they occupy before a cycle of machine operation.

Referring to Fig. 10, the lever 114 extends rearwardly where it is pivoted at 116 to a portion of the stationary frame of the machine. This lever carries a cam 117 adapted to be engaged by a stud 118 on a cam plate 119 that is rocked each time the machine is given a cycle of operation. During the forward stroke of the machine, the cam 119 is rocked counterclockwise as viewed in Fig. 10, and, during the return stroke, it is returned clockwise to the position of Fig. 10. During this movement the stud 118 engages cam 117 and moves arm 114 upwardly, the upward movement occurring immediately at the beginning of each cycle of machine operation.

The upward movement of arm 114 causes slide 112 together with lever 113 to move counterclockwise from their Fig. 7 to their Fig. 8 position, where they are held by a latch 120 pivoted on the member 87. The latch has a hooked end engaging under the stud 111 to hold the parts in position during the entire cycle of operation of the machine. The latch is released near the end of the cycle, as will be later described.

A second arm 130 (Fig. 8) is fixed to shaft 81 and this arm is connected by a link 131 to an arm 132 fixed to a shaft 133. The shaft 133 extends to the rear of the machine and, at the rear (Fig. 14), a bell crank lever is fixed to it. One arm 134 of this bell crank lever has a stud and cam slot connection 135 with one arm 136 of a bell crank lever pivoted at 137. The other arm 138 of this bell crank, partly broken away in Fig. 14, extends downwardly to a position for engaging a stud 139 on the end of the sliding comb plate 100. The bell crank arm 134 is urged counterclockwise as viewed in Fig. 14 by a spring 141, and, since arm 134 is fixed to shaft 133, the shaft is urged in the same direction.

Assuming that the paper carriage positions the slide 112 over the lug on arm 114 (Fig. 7) in a given column, it will be evident that, as the machine is given a cycle of operation, the arm 114 will be rocked at the beginning of a cycle and the shaft 81, through slide 112 and arm 113, will be rocked counterclockwise, as viewed in Fig. 7, to the Fig. 8 position. The shaft 133, through connections 130—132 will be rocked clockwise as viewed in Fig. 14 which will rock bell crank 136—138 counterclockwise and move the comb plate 100 to the right (Fig. 14). This movement occurs prior to any upward movement of the comb plate, and the plate moves from its Fig. 14 to its Fig. 17 position. With the comb plate in this position, when it is moved upwardly, the rack bars in the right hand section will be blocked instead of those in the left.

It will thus be clear that the paper carriage not only automatically determines whether an amount set up on the amount keys shall be indexed in the right or left hand section of the indexing mechanism, but it also automatically controls the rack bars so that only those in the appropriate section will be released.

As previously explained the multiple registers are contained in a rotary magazine having twenty sets of register pinions. Each set is divided into a right and left hand section so that the magazine contains, in effect, forty registers.

The magazine may be indexed by hand or automatically by the paper carriage, as previously explained. When any set of register pinions is indexed and after this set has been moved into the register frame for cooperation with the actuator racks, both the right and the left hand groups of pinions of the indexed set are in position for operation. However, since an amount entered on the keys is indexed only in either the right or the left hand section of the indexing mechanism and since the rack bars are blocked in the section that has not been indexed, it follows that an amount entered on the keys will be entered in only one of the groups of register pinions.

To put it another way, there is an automatic selection of groups of register pinions comprising two registers, an automatic and selective control of the indexing mechanism; and an automatic control of the rack bars such that an amount entered on the keys is entered only in the proper register, that is, the right or the left hand register of the two registers that are indexed.

Split printing mechanism

The printing mechanism in a machine of this type is normally conditioned to print ciphers to the right in all orders in which no amount has been indexed. It follows that, if nothing were done to prevent it, when items were entered in the left hand section of the machine, ciphers would be printed in all the orders of the right hand section.

This difficulty is avoided by providing a split in the printing mechanism between the right and left sections so that ciphers will not carry from the left section into the right. The manner in which this split of the printing mechanism is accomplished will appear more clearly from a later description of another split-printing control.

Means for indicating which section of the machine has been indexed and which register has been selected A visible indicator is provided for informing the operator whether the right or left section has been indexed and which register of the forty multiple registers has been selected.

This indicator is of the general type shown in Muller 1,920,477. It includes a stationary dial 150 (Fig. 12) on which the numbers of the multiple registers appear. A movable pointer 151 is geared to the register magazine so that the position of the pointer corresponds to the indexed position of the magazine. The details of the connection are illustrated and described in Patent No. 1,920,477, to which reference is made.

Since the register magazine has only twenty index positions, but contains forty registers, the pointer cannot, with the construction so far described, indicate what register is indexed.

To solve this problem, two concentric rows of numbers are placed on the disk 150, the outer row, or circle, containing the numbers from 1 to 20 and the inner row the numbers from 21 to 40. Mounted in front of the disk 150 is a shiftable disk, or mask, 152 having two series of concentric openings 153 that are offset with relation to one another. When the disk is in the position shown in Fig. 12, the outer circle of numbers, 1 to 20, is visible. When the disk is shifted to its other position the inner row of numbers is visible.

Figure 12:
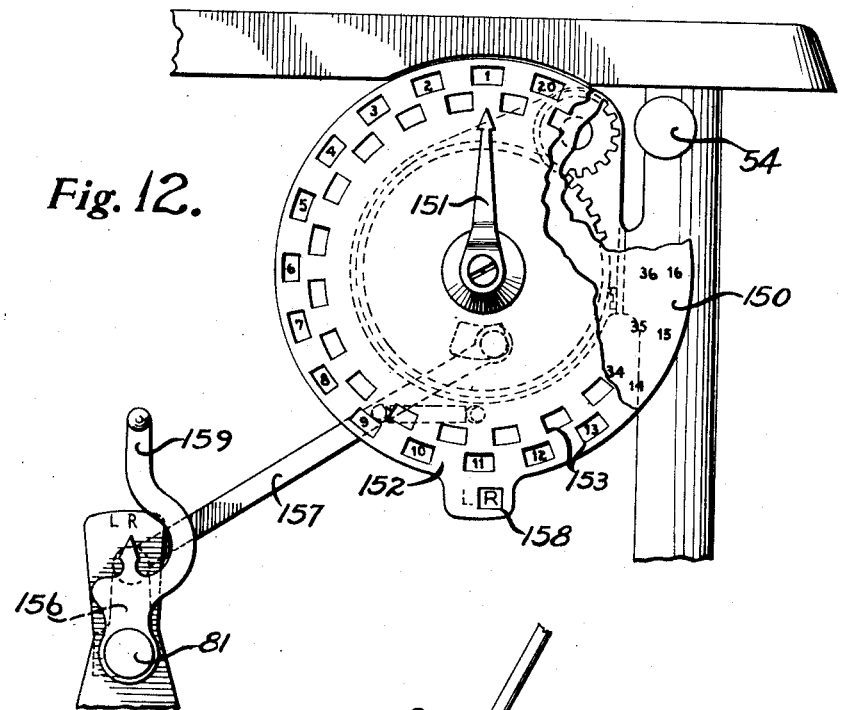
Fig. 12 is a detail front elevation of the indicating means for indicating which of the registers has been selected.

The disk 152 may be moved by hand or automatically. It is automatically positioned under the control of the paper carriage as follows:

Referring to Fig. 3, the lever 80 which is pivoted loosely on shaft 81, and which is moved under the control of the paper carriage as previously described, has a pin and slot connection with an arm 154 that is also pivoted loosely on shaft 81. The arm 154 is part of a yoke 155 (Fig. 1) that extends forward along the shaft 81 where it is again supported on the shaft and then provided with an arm 156 (Fig. 12). Arm 156 is connected by link 157 to the disk 152.

When the carriage reaches a columnar position where one of the carriage cams 94 is active, the arm 80 is rocked which, through the connections just described, causes the arm 156 to be rocked counter-clockwise as viewed in Fig. 12. This moves disk 155 from its normal Fig. 12 position to a position where the inside circle of register numbers (21 to 40) are visible.

The indication as to whether the right or left-hand section is indexed is obtained by having an opening 158 in the disk which is moved over the letters R or L, depending upon the position of the disk.

From this it will be seen that not only can the multiple registers be automatically selected and the machine automatically indexed in the right or left section, but the pointer 151, in connection with the movable disk 152 will automatically indicate which register has been selected while the opening 158 will reveal which side of the machine has been indexed.

A manual control for indexing the right or left-hand side of the machine is provided, which also controls the disk 152. This is in the form of an arm 159 that is fixed to shaft 81. The operator can move this arm from the "R" position to the "L" position and vice versa to rock shaft 81 and shift the disk 152. When the shaft 81 is rocked manually through the arm 159 counterclockwise from its normal right-hand position of Fig. 12, the previously mentioned arm arm 130 (Fig. 8) also fixed to the shaft 81 engages the stud which is mounted on the plate 65 and engages in the slot in arm 80 and the plate 65 as well as the comb plate 100 are shifted, the latter through the link 131, to the position where amounts entered on the keys are indexed in the left-hand section of the machine.

Addition in multiple registers

Addition may be performed on any of the multiple registers.

After the magazine 50 has been indexed, the indexed group of pinions is moved into the frame 23. The carriage determines whether the right or left group of pinions shall be active. For addition operations, the actuator racks are differentially positioned under the control of the amount keys after which the register is rocked into engagement with the racks and the item entered during the return of the latter.

Totals and sub-totals from multiple registers

It is possible to take a total or a sub-total from each of the multiple registers.

For that purpose the register magazine is indexed, and, then, upon depression of the total, or the sub-total, key, the indexed set of pinions moves into the frame 23. During the cycle of machine operation, the actuator racks are differentially positioned under the control of the selected register and the total is printed. The pin carriage is not raised during a total taking operation. In the case of a total, the register is cleared, but, in the case of a sub-total the amount remains in the register. After a total or sub-total taking operation, the set of indexed register pinions is returned to the magazine.

In total taking operations it is necessary to block the actuator racks in the section of the machine from which the total is not taken. During a total taking operation, the indexing mechanism is not indexed and hence there is no portion of this mechanism available to block the rack bars. But, it will be recalled that the comb plate 100 (Fig. 14) is raised during each machine operation regardless of whether that operation is an item entering or a totaling operation. Further, it will be recalled that this comb plate is selectively positioned with respect to the right or left-hand sections of the machine by means of the paper carriage. Accordingly, when the carriage is in a predetermined columnar position where a total is to be taken from the right or left group of pinions, the comb plate 100 will be automatically positioned in accordance with the columnar position of the carriage and, as the machine is given a cycle of operation, the comb plate will act to raise the pendants 27 and stop members 30 to block the racks in the section of the machine from which the total is not taken.

*Subtraction in multiple registers*

It is also possible, in the present machine, to subtract an item from any of the multiple registers.

The register magazine 50 is indexed and the indexed group of pinions moves into the frame 23 upon depression of the amount keys. The operator then conditions the machine for subtraction and causes it to go through the subtraction operations heretofore described.

Certain problems arise, however, in performing subtraction selectively in the right and left registers that happen to be indexed.

It will be recalled that subtraction is performed by a process of complemental addition and that, during the second cycle of machine operation in subtraction, the rack bars move forward to differential positions determined by the pendants, and that the rack bars in the orders above the amount indexed are allowed to move forward to their "9" positions. It will be apparent that, if subtraction were being performed in the right-hand register, and if all the higher order rack bars were allowed to move forward to their "9" positions, nines would be entered in the left-hand register. Accordingly, it is necessary to provide means for allowing the higher order rack bars in the right-hand section only to be moved to their "9" positions during a subtraction operation in that section. This is taken care of by the comb plate 100 which, it will be recalled, is raised during each operation of the machine no matter whether it is an addition, subtraction, or a total taking operation. This comb plate is selectively positioned by the paper carriage and, when the machine is conditioned for operation in the right-hand register, the comb plate is positioned so that, when it is raised, it will block the racks in the left-hand section. Accordingly, when subtraction is being performed in the right-hand section, the racks in the left-hand section will be blocked against movement, but this will not interfere with movement of the higher order racks of the right-hand section to their "9" positions.

Another factor that enters is the "extra 1" mechanism. A mechanism of this kind must be provided in order to get the correct result in subtraction. However, if this mechanism is arranged to operate for the units pinion of the right-hand section it will not necessarily operate for the units pinion of the left-hand section.

*"Extra 1" mechanism for multiple registers*

The "extra 1" mechanism for the multiple registers is controlled automatically and selectively so that when subtraction is performed in the right-hand register the "extra 1" will be entered in this register and, when subtraction is performed in the left-hand register, the "extra 1" will be entered in the left-hand register.

Referring to Fig. 19, the subtraction plate 31, which is raised during a subtraction operation, carries a stud 160 adapted to engage a pass-by pawl 161 (Fig. 20) movably mounted on one arm 162 of a bell crank lever pivoted at 163. The other arm 164 of this bell crank lever is connected by a link 165 to one end of a lever 166 pivoted at 167. When the subtraction plate 31 is raised, the stud 160 engages the pawl 161, but the latter moves on its mounting and allows the stud to pass. During the return of the plate 31 the stud engages the cam nose of the pawl 161 and rocks the bell crank lever 162—164 clockwise as viewed in Fig. 19 which results in rocking the lever 166 counterclockwise.

The lever 166 has a long lateral extension shown in Fig. 21 carrying a slide plate 168 mounted for a limited sliding movement on the extension. This slide plate has a wide extension 169 which, in the position of the parts shown in Fig. 21, is under a stud 170 carried by a latch 171 connected to a toothed segment 172 engaging the units order pinion of the right-hand register.

When the slide 168 is moved to the left of its Fig. 21 position, the extension 169 moves under a stud 173 on a latch 174 connected to a toothed segment 175 engaging the units order pinion of the left-hand register.

It will be apparent that, if the lever 166 is rocked counterclockwise as viewed in Fig. 21, either the latch 171 or the latch 174 will be raised depending upon the position of the slide plate 168. When either of these latches is raised, it releases the toothed segment to which it is connected and said segment is moved one step by means of its spring, such as the spring 176 for segment 172, to enter a unit in its respective pinion. It follows that, during a subtract operation of the machine, an "extra 1" will be entered in either the right or the left register depending upon the position of the plate 168. Means is provided for automatically controlling the position of this plate as follows:

The left-hand end of slide 168 has two upwardly projecting lugs 180 which are astride of a lug 181 on a yoke 182 pivoted loosely on a shaft 183. The yoke, has a lug 184 positioned in the bifurcated end of a lever 185 pivoted at 186. The other end of this lever is astride the upper end of another lever 187 pivoted at 188 and connected by a cam slot and stud connection to the lever 132. Referring to Fig. 8, it will be observed that the lever 132 is one of the levers whose position is controlled by the paper carriage through link 131, arm 130 and shaft 81.

When the parts are in the position of Fig. 21, the plate 168 occupies its right-hand position and the machine is conditioned to automatically enter an "extra 1" in the units order of the right-hand register when the machine is given a cycle of operation to perform subtraction.

In a columnar position where the parts are automatically conditioned for operations in the left-hand register, the lever 187 is moved clockwise as viewed in Fig. 21. This rocks the lever 185 clockwise and results in sliding the plate 168 to the left so that the projection 169 is under the stud 173 instead of the stud 170. Accordingly, when the machine is given a cycle of operation in this columnar position of the carriage in order to perform subtraction, an "extra 1" will be automatically entered in the units pinion of the left-hand register without disturbing the right-hand register.

An "extra 1" mechanism is thus provided which not only enters the "extra 1" automatically but which selectively enters it in one of the two registers that has been indexed.

*Negative totals from multiple registers*

It is possible, in the present machine, to take a negative total from any one of the forty multiple registers.

When a negative total occurs in one of the multiple registers, the total in the register is the complement $10^n - T$ of the true negative total T. The first operation is to transfer this complement to the pendants at the rear of the machine which is done by depressing the front total and extend keys and giving the machine a cycle of operation. The subtract key is then depressed and, during the next cycle of machine operation, the amount $10^n - 1 - T$ is added by the racks 10, under the control of the stop members 30, into a clear register which may be the same multiple register, or preferably the main register, and an "extra 1" is also added into the same register, and, then, during a third cycle of operation, the true total is taken from this register and printed.

During the negative total taking operations the printing mechanism is blocked by a means such as shown in Mueller Patent No. 1,881,852 until the last cycle of operation, during which the true negative total is printed.

*Negative total signal and lock for multiple registers*

A negative total signal and lock is provided for indicating to the operator the fact that a negative total exists in the multiple register that is in indexed position. This is not always employed as the machine is often used where such a lock and signal are unnecessary, in which event these parts are omitted.

Figure 25:
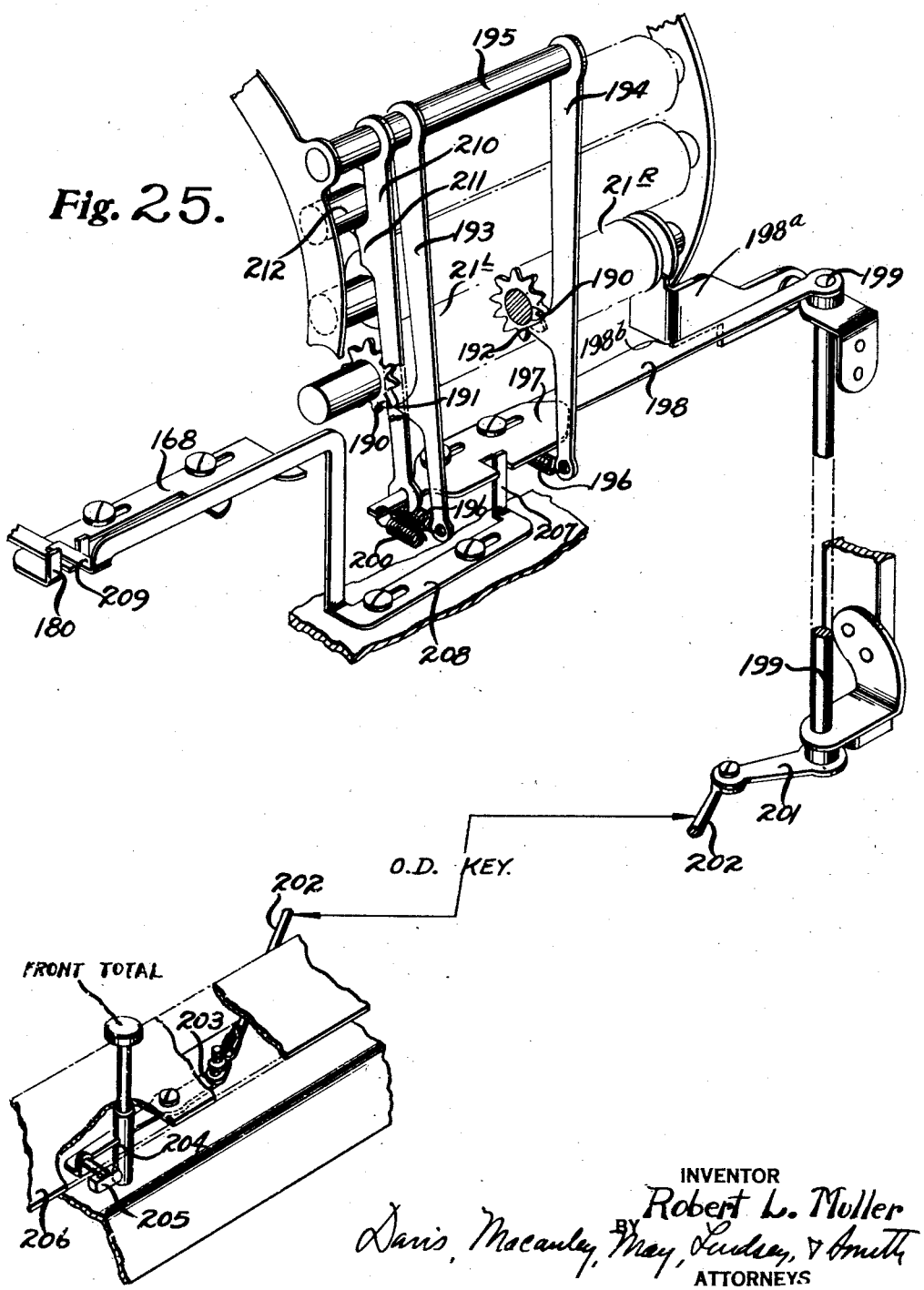
Fig. 25 is a perspective view of the parts used particularly in taking a negative total.

Referring to Fig. 25, the pinion of highest order of each of the two multiple registers 21, that are in indexed position, has a wide tooth 190 adapted to be engaged by the noses 191 and 192 of pawls 193 and 194, respectively. These pawls are pivoted loosely on a shaft 195 and urged clockwise as viewed in Fig. 25 by their respective springs 196. The lower ends of these pawls are adapted to bear against the edge of a slide plate 197 mounted on the end of an arm 198 fixed to a vertical shaft 199. This arm is urged counterclockwise as viewed in Fig. 25 by a spring 200 attached to the outer end of the slide plate 197 on the arm. The spring 200 is sufficiently weaker than either spring 196 that the arm 198 can be rocked against the tension of spring 200 by either pawl 193 or 194 under the urge of its respective spring 196. Fixed to the lower end of the shaft 199 is an arm 201 connected by a link 202 to a pivoted lever 203 shown in both Figs. 25 and 13.

The lever 203 is adapted to move into a slot 204 in the stem of the "front total" key. The lever also has a negative total signal and release key 205 on its outer end.

As the parts are shown in Fig. 25, the "front total" key is locked and the signal 205 is projected, but, normally, when there is no negative total in a multiple register, the arm 198 occupies a slightly counterclockwise position from that shown in Fig. 25 and the lever 203 is rocked clockwise from its position so that the "front total" key is released and the negative total signal and release key 205 is positioned beneath a shield 206.

When there is no negative total in either of the multiple registers, the pawls 193 and 194 occupy the positions shown for the pawl 193 in Fig. 25, that is, the nose 191 of the pawl bears against the wide tooth 190 of the highest order pinion. If a negative total occurs in one of the registers, its pinion of highest order moves away from its "0" position with the result that its wide faced tooth is moved out of the path of the nose of its respective pawl. The pawl is then rocked clockwise by its spring 196 and the lever 198 is rocked to lock the "front total" key and move the negative total signal to indicating position.

The negative total signal and lock is selectively controlled so that it is rendered operative with respect to the particular one of the two registers that is indexed. For this purpose the slide 197 is provided with a notch in which a lug 207 on a slide 208 is positioned. The slide 208 extends to the left as shown in Fig. 25 and it has another lug 209 extending between the projections 180 on the slide 168. It will be recalled that the slide 168 is moved laterally in accordance with whether the right or the left-hand side of the machine is rendered active and this movement is preferably automatically governed by the paper carriage. Thus, the slide 197, against which the pawls 193 and 194 engage, is responsive to whether or not the left or right-hand side of the machine is indexed. This slide is shown in Fig. 25 as positioned for the right-hand side of the machine where it will be observed that the edge of the slide is in front of the pawl 194, but is out of the path of the pawl 193. In this position of the parts, the pawl 194 is active to control the negative total signal in response to the character of the total in the right-hand register 21.

If the left-hand side of the machine should be conditioned for operation, the slide 197 is moved to the left as viewed in Fig. 25 which places its edge in the path of the pawl 193 and removes the edge from the path of the pawl 194. The slide 197 is then responsive to movements of the pawl 193 for the left-hand register and will set the negative total signal and lock in response to the condition of said register.

In order to prevent the negative total signal and lock from operating in a detrimental way while the register magazine is moving from one position to the other, an arm 210 is loosely mounted on the shaft 195 and provided with a cam surface 211 which is engaged by the studs 212 as the magazine moves from one position to the other. The lower end of this arm straddles the end of the slide plate 197 on the arm 198 and prevents the arm from being moved clockwise while the register magazine is being moved from one indexed position to another. When the indexed registers are moved out of their support, an angle piece 198$^a$ (Fig. 25) moves with them. The corner of this piece engages a cam edge 198$^b$ and swings the arm 198 counterclockwise in Fig. 25 to move the arms 193 and 194 so that the noses 190 and 191 will not interfere with the lateral movement of the registers.

In the construction shown, when a negative total occurs in any of the multiple registers, the operator is informed of that fact and he knows whether it is the right or left-hand one of the two registers that are indexed. He is informed because if the negative total occurs in one of the registers it occurs in the one in which an entry has just been made. The indicator opening 158 reveals whether the operation is in the right or left register. This register is automatically returned to the magazine at the end of the cycle of machine operation. When the register returns to the magazine, the negative total lock will operate to project the signal and lock the "front total" key, thus informing the operator that a negative total exists.

A negative total may occur in a multiple register after which this register may be moved out of indexed position without a total having been taken. When the register is again returned to indexed position, the negative total lock and signal inform the operator that there is a negative total in the register that has just been indexed. When the magazine moves to indexed position, there are two registers that are indexed. If the machine is conditioned for operation in the register that has a positive total in it, then the negative total lock and signal still remain in normal position. If, however, the machine is conditioned for operation in the register containing a negative total, the negative total lock and signal will be operated to project the signal and lock the "front total" key. This action is due to the fact that if there is a negative total in the register, the wide tooth 190 on the pinion of highest order of the register will not be in front of the projection on the respective pawl 193 or 194 so that the pawl will move under the urge of its spring to set the negative total lock and signal.

It will be understood, of course, that in the use of the multiple registers, the pinion of the highest order is not used for ordinary calculating operations, but is employed as an extra pinion to control the negative total lock.

In the event only one side of the machine is used, the negative total lock becomes active immediately upon the return of a register, having a negative total in it, to indexed position. In the event both sides are used, the automatic carriage control conditions the machine for the right or left side and if there is a negative total in the right or left register that is indexed, the signal immediately notifies the operator of the fact.

*Main register*

The rear register 20 constitutes what may be called the "main register," or "cross footer," that is, it is a register in which various calculations can be performed including the accumulation of grand totals.

The main register, which is positioned in the register frame 22, may be rocked into and out of engagement with the actuator racks to perform addition, or subtraction, and to enable totals, sub-totals, and negative totals to be taken. Suitable control keys are provided for controlling the main register in the performance of these functions and, while some of these keys are hereinafter referred to, not all of them have been illustrated and described, reference being made to Hopkins 1,336,904 for details.

*Automatically positioning main register for operations in right or left section of the machine*

The main register normally occupies a right-hand position such as shown in Fig. 14. In this position, the units order pinion is in line with the units order rack of the right-hand group of racks 10R.

If the main register is to cooperate with the left section of the machine, its units order pinion must be in line with the units order rack of the left-hand group 10L, which rack is in the 8th left-hand column, or bank, from the right side of the machine.

To enable this change of position to be accomplished, the main register pinions are rotatably mounted on a sleeve 220 slidably mounted on a shaft 221 so that the register may be shifted from its Fig. 14 to its Fig. 17 position. Provision is made for shifting the register from one position to the other automatically in accordance with the section of the machine that is conditioned for operation.

Fixed to the register sleeve 220 is a shaft 222 carrying a stud 223 positioned in the bifurcated end of a lever 224 pivoted on an arm 225 fixed to the shaft 133. It will be recalled that the shaft 133 is rocked automatically under control of the carriage in connection with the selective conditioning of the right and left sections. The arm 225 and lever 224 normally occupy the position shown in Fig. 14 to which position they are urged by spring 141 which pulls on arm 134 also fixed to shaft 133. The mounting of lever 224 on arm 225 is a yielding one, and the parts are proportioned so that, as arm 225 moves to the right in Fig. 14, it will move a little after lever 224 has been limited by the arrest of the main register in the position of Fig. 17. This holds the register firmly in its Fig. 17 position.

When the main register is in its left-hand position its three highest order pinions are in line with three of the extra four racks 10X at the left. The eleventh pinion 20X is always in line with the fourth rack 10X.

When the carriage reaches a position where one of the cams 94 becomes active, the parts are conditioned, so that, during a cycle of operation of the machine, the shaft 133 is rocked clockwise from the position of Fig. 14 to that of Fig. 17. When this occurs, the main register controlling shaft 222 is moved to the right (Fig. 14) and this moves the rear register pinions 20 to their left-hand position.

It will thus be seen that, when the machine is automatically conditioned for the entry of an item in the left section of the machine, the main register is automatically positioned so that it can cooperate with the left section. The automatic conditioning of the machine also results in blocking the actuator racks for the right-hand section as previously explained.

When the machine is again conditioned for operations in the right-hand section, the main register is automatically returned to its right-hand position and the racks in the left-hand section are blocked during a cycle of operation.

The main register is thus automatically positioned in accordance with the section of the machine that is conditioned for indexing.

A tens transfer mechanism is provided for the rear register, of which one of the transfer segments 225 is shown in Fig. 1 and Fig. 19. This mechanism extends across the machine so as to be operable in both of the lateral positions of the register.

*Totals and sub-totals from main register*

It is possible to take a total or sub-total from the main register, but, because of the division of the machine into right and left sections, certain problems arise as will presently appear.

In taking a total, the main register is first rocked into engagement with the racks and the latter are then allowed to move to differential positions under the control of the register pinions which are arrested at "0." The printing mechanism then operates to print the total after which the register is rocked out of engagement with the racks and the latter are returned to normal. The register is then clear and the racks in position for succeeding operations. In the case of a sub-total the register is not rocked out of engagement before the return of the racks, but is allowed to remain in engagement so that the total remains in the register.

Since the main register may have to accumulate all the totals in the forty multiple registers, it must have a larger capacity than the individual multiple registers. In the embodiment shown, the main register has ten pinions as shown in Fig. 14, whereas each of the multiple registers has only seven of which six are used for accumulating items. The main register is provided with an eleventh pinion 20X (Fig. 14) but this pinion controls a negative total lock that will be described later. Since the actuator racks 10 are divided into two groups of seven each, it will be obvious that the main register overlaps from one group of racks to the other. But these groups are selectively blocked, and the overlapping pinions, for example, the three highest order pinions in Fig. 14, may be in line with racks that are blocked in this position of the register.

In the present machine, a total is never taken from the main register when the latter is in its left-hand position because there is no printing mechanism associated with the racks 10X. In order to prevent this an interlocking mechanism has been provided as follows:

The machine is conditioned for total taking by depressing the rear total key "Bal." (Fig. 13), or, in the case of a negative total, as will be later explained, by depressing the "Cr. Bal." key (Fig. 13). The total key, "Bal.", is connected to a bell crank lever 230 (Fig. 18) which, in turn, is connected to a rod 231 that conditions the machine for total taking in the rear, or main, register. Positioned beneath these keys is a slidable locking plate 232 (Fig. 13) having upstanding lugs 233 (Fig. 13) adapted to block depression of the keys "Bal.", "Cr. Bal.", and "Sub. Bal." The slide plate 232 is urged to the left in Fig. 13 by a spring 234 and the plate is normally free to move to the right which it does upon depression of either of the three keys just mentioned, the lugs 233 having beveled edges engaged by the stems of the keys.

Positioned adjacent the right-hand end of locking plate 232 is the end of a slide 235 having a lug 236 which can be positioned in the path of a lug 237 on plate 232 to block movement of 232 to the right. The slide 235 extends rearwardly where it is connected (Fig. 1) through a yielding connection to one arm of a lever 238 pivoted on a shaft 239. The upper end of this arm is positioned beneath a stud 240 on the arm 241 (Fig. 3) integral with arm 80. It will be recalled that, when the machine is conditioned for calculations in the left section, the arm 80 is rocked counter-clockwise as viewed in Fig. 3. This rocks the lever 238 counterclockwise in Fig. 1 and moves the slide 235 forward to place lug 236 in the path of lug 237 to block movement of plate 232. Accordingly, when the machine is conditioned for operations in the left section, the total keys "Bal.", "Cr. Bal." and "Sub. Bal.", for the main register are locked. When the machine is restored to condition for performing calculations in the right section, these keys are unlocked and a total, subtotal, or credit balance or negative total can be taken.

As mentioned, in taking a total, the actuator racks are released for forward movement under the control of register pinions. The rear register has ten pinions from which the total must be taken, these pinions being positioned as shown in Fig. 14 with respect to the actuator racks. But, when the machine is conditioned for calculations in the right-hand section, the rack bars in the left-hand section are blocked against movement, which means that, normally, the three rack bars corresponding to the three pinions of highest order of the main register cannot be moved. Obviously, if these rack bars could not move forward, a total could not always be taken from the main register. Provision is made for conditioning the control of the racks in a special manner when a total is taken from the main register.

Referring to Fig. 18, each of the total keys, of which one, the key "Bal." is shown in Fig. 18, is connected to a bell crank such as the bell crank 230 previously mentioned. Positioned in front of these bell cranks is a bail 250 pivoted at 251 to stationary brackets. Attached to the upper end of this bail is a rod 252 extending rearwardly where it is connected to a slide 253 that, in turn, is connected to one arm 254 of a three-armed lever (Fig. 14) pivoted at 255. One of the arms 256 of this lever extends to the left in Fig. 14 and the other arm 257 is positioned adjacent a shoulder on a slide plate 258 carried on a lever 259 pivoted at 260 to a stationary frame plate. The upper end of lever 259 carries a yieldingly mounted pawl 261 positioned behind the stud 139 on the comb plate 100.

When one of the total keys is depressed, the bail 250 (Fig. 18) is moved forward which pulls slide 253 forward and rocks the three-armed lever (Fig. 14) counterclockwise as viewed from above. The arm 257 of this lever rocks lever 259 clockwise from the position of Fig. 14 to that of Fig. 16, until a stud 262 on the comb plate limits against a limit member 263. The comb plate 100 is moved sufficiently to the left (Fig. 16) to allow the seven lugs 101L to move from under the three right-hand pendants 27 of the left-hand group 27L. This leaves the ten pendants corresponding to the ten main register pinions free, that is, they will not be raised to block their actuator racks when the comb plate is raised. The comb plate still remains in position to raise the pendants 27 above the tenth column.

From this it will be clear that, when the comb slide 100 is raised during a cycle of machine operation in taking a total from the rear register when the latter is in its right-hand position, only the last five racks in the left-hand section will be blocked against movement. Or, to put it another way, the three right-hand racks of the left-hand section are free so that they may move forward together with all of the racks of the right-section and a total may be taken from the ten main register pinions.

Accordingly, when the machine is conditioned for taking a total from the rear register, control of the actuator racks is modified so that proper racks can move forward to take the total.

The total is printed by having the printing mechanism operate after the actuator racks have been differentially positioned under the control of the registers. But, as previously explained, this printing mechanism is normally split between the right and left sections of the machine, that is, between the seventh and eighth columns. In taking a total, however, the first ten columns on the right are used and it follows that it becomes necessary to change the condition of the printing mechanism so that the complete total will be printed.

Referring to Fig. 18, each rack bar 10 is provided with a latch 270 that controls the firing of the printing hammer 15 of its bank. Each latch normally occupies a notch 271 in its rack bar but, as the rack bar moves forward, it moves the latch so as to condition the printing mechanism in that order for operation. Overlapping connections are provided between the latches of each order, except as hereinafter mentioned, so that, if any latch of a lower order is not released by movement of its actuator rack, said latch will be released by a latch of higher order. This overlapping is obtained by having each latch provided with a lateral lug overlapping the latch of next higher order. In the present case, the latch for the seventh column does not overlap the latch for the eighth column with the result that the printing mechanism is normally split between these two columns. But, for total taking from the main register, it is necessary to reconnect the latches between the seventh and eighth orders and this is done as follows:

Mounted on the eighth column latch is a slide 272 provided with a stud 273 adapted to be moved under a lug on the seventh column latch. Connected to the slide 253 (Fig. 18), which is moved forwardly upon depression of one of the total keys for the main register, is one end of a lever 275 pivoted at 276. The other end of this lever is connected to a second lever 277 pivoted at 278 and connected at its upper end to the slide 272. When one of the total keys for the main register is depressed, the lever 275 is rocked counterclockwise which rocks the lever 277 clockwise and moves the slide 272 forward to position the stud 273 under the lug on the seventh order latch so as to connect the printing mechanism between the 7th and 8th orders.

Accordingly, when a total is taken from the main register, the printing mechanism is automatically conditioned so that it will operate in all of the columns in which the actuator racks are released in the total taking operation. It is not necessary to provide a split between the 10th and 11th columns because no racks will be indexed in the columns above the 10th as these racks are blocked.

From all the above it will be apparent that it is impossible to take a total from the main register except when the register is in its right-hand position; that, when said register is in this position, a total may be taken without the operator giving the machine any attention other than depressing the appropriate total key and giving the machine a cycle of operation; and that the depression of this total key will condition the machine so that in spite of special control of the rack bars and of the printing mechanism normally provided between the right and left sections of the machine, a complete total will be taken and printed.

*Subtraction in main register*

It is possible to subtract an amount from the main register when the latter is in either its right or left-hand position.

Subtraction is performed by a process of complemental addition involving the adding of "9's" in the orders above the item that has been indexed. The item to be subtracted is set up on the amount keys and, during the first cycle of machine operation, is transferred to the pendants at the rear of the machine. During the next cycle of machine operation, the racks are differentially positioned under the control of the pendants and the complement is added in the register which, in effect, amounts to subtracting the indexed item.

When the main register is in its left-hand position, the actuator racks in the right-hand section are blocked against movement. However, the racks in the left-hand section including the four extra racks to the left (Fig. 3) are free and, since, with the register in this position, it is necessary only to use the left-hand racks, the machine is in correct condition for subtraction. The four left-hand extra racks 10X are provided mainly to insert "9's" in the four highest order pinions of the main register. Three of the racks 10X are fastened together and are controlled by a stop member 30 in the 15th order from the right. The fact that these racks move as a unit does not interfere with addition or subtraction operations in the main register because items are never added or subtracted in excess of seven orders. The fourth rack 10X is in line with the eleventh pinion 20X of the rear register which controls a negative total locking device explained later. Tens transfers to the main register pinions above the seventh order are not interfered with because these transfers occur while the register is out of engagement with the racks.

When the main register is in its right-hand position, the three pinions of highest order are in line with three of the racks in the left-hand section that are normally blocked against movement when the machine is conditioned for operation in the right-hand section. In order to perform subtraction, for the full capacity of the main register, it is necessary to provide special controls for releasing the three lower order racks of the left-hand section.

To accomplish this the rear subtract key "rear subtract" (Fig. 13) is provided with a rod 280 which is pulled forward when the key is depressed. When this subtract key is depressed, the control cams for the registers are moved laterally so that only the rear register is engaged, as described in Hopkins 1,206,113, page 6, beginning with line 60. At its rear end (Fig. 14) the rod 280 is connected to one end of a lever 282 pivoted at 283. The other end of this lever is connected by a pin and slot connection 284 with the arm 256 of the three-armed lever 254—256— 257 heretofore described. It will be recalled that this three-armed lever is moved counterclockwise as viewed from above when the rear total key is depressed and the comb plate 100 is moved to its Fig. 16 position. In the same manner, when the "Rear subtract" key is depressed, the three-armed lever is rocked to move the lever 259 from the position of Fig. 14 to that of Fig. 16. This moves the comb plate 100 from its Fig. 14 to its Fig. 16 position, that is, to a position such that when the comb plate is raised, the racks in the first ten columns will be freed instead of those in only the first seven columns.

This special control of comb plate 100 is necessary when the main register is in its right-hand position but such control is not wanted when the register is in its left-hand position. Since the "Rear subtract" key is depressed in subtracting from the main register in both of its positions, the control of the comb plate 100 by the "rear subtract" key must be modified in accordance with the position of the register.

Referring to Figs. 16 and 17, it will be observed that the slide 258 is mounted to enable it to have a limited vertical movement on lever 259 from the position of Fig. 16 to that of Fig. 17. When the slide is in its Fig. 17 position, its lower end is above the plane of the lever 257 of the three armed lever 254—256—257. As shown in Fig. 22, this slide is connected by a lateral lug to a vertical slide plate 285 urged downward to its Fig. 22 position by a spring 286. The upper end of plate 285 has a laterally bent end extending over a stud 287 on an arm 288 fixed to shaft 133 (Fig. 14) that is rocked in the automatic control of the right and left sections of the machine.

When the machine is conditioned for operation in the left-hand section, the arm 288 is rocked clockwise as viewed in Fig. 14 which raises stud 287 and raises plate 285 from its Fig. 22 to its Fig. 24 position. This raises the slide 258 above the plane of arm 257 so that, even though the "rear subtract" key is depressed the lever 259 will not be rocked and there will be no special control of the comb plate 100 by the rear subtract key.

The mechanism so far described makes clear how subtraction can be performed in the main register when the latter is in either its right or left-hand positions, but it is still necessary to enter an "extra 1" and this calls for a mechanism that will act in both the right and left-hand positions of the main register.

*"Extra 1" mechanism—main register*

Referring to Fig. 21, a toothed segment 290 is provided for engaging with the units pinion 20 of the main register when the latter is in right hand position. This segment is urged counterclockwise by a spring 291, but is normally latched against movement by a latch 292 having a shoulder engaging behind a plate 293. The latch may be released by the upturned end of a lever 294 pivoted at 295. The other end of this lever extends into the bifurcated end of a lever 296, a portion of which is shown in Fig. 21.

A toothed segment 300 is also provided in the eighth order, which segment is likewise urged counterclockwise by a spring 301 but normally latched against movement by a latch 302 engaging behind the plate 293, which has been omitted at this point for the sake of clearness. The segment 300 forms a part of the tens-transfer mechanism and acts as such when the main register is in right hand position. However, when the main register is moved to its left hand position, this segment 300 is in engagement with the units pinion of the main register and it then acts to insert an "extra 1." The latch 302 for this segment may be released by one end of a lever 303 pivoted at 295, the other end of said lever being engaged in the bifurcated end of a lever 304, of which a portion is shown in Fig. 21.

If the latch 292 for the segment 290 is released at the appropriate time, the segment 290 will move a step to insert an "extra 1" in the units pinion of the main register when the latter is in right hand position. With the main register in left hand position, if the latch 302 is released at the appropriate time, the segment 300 will move a step to insert an "extra 1" in the main register while the latter is in its left hand position. Provision is made for automatically releasing these latches at the appropriate time during a cycle of operation of the machine and for selectively releasing them in accordance with the left or right hand position of the main register.

Referring to Fig. 19, a rear subtract plate 310 is provided which is raised during the first part of the second cycle of machine operation in a subtraction operation in the rear register. The operation of this plate and its control by the "rear subtract" key is the same as the control of the subtract plate 31 for the "front subtract" key and the description will not be repeated. This subtract plate has a stud 311 adapted to engage a lug 312 on a pass-by pawl 313 shown in Fig. 23. The other end of this pass-by pawl is positioned under a stud 314 on a lug extending from a member 315 (Fig. 22) that is pivotally and slidably mounted on a stud 316 on one of the frame plates of the machine. The member 315 is urged downward to its Fig. 22 position by a spring 317.

When the subtract plate 310 is raised, the stud 311 passes the pawl 313 without affecting the position of the member 315, but, upon the return of the subtract plate, the stud engages the lug on the end of pawl 313 and rocks the latter counterclockwise (Fig. 23) which raises the member 315. This raising occurs during the latter part of the second cycle of machine operation in a subtract operation.

The upper end of member 315 has a T-shaped slot 320 in it. The lever 304, connected to the release lever 303, is pivoted on the shaft 321, and its other end carries a stud 322 adapted to engaged in the T-slot 320. Likewise the lever 296, one end of which is connected to the release lever 294, is pivoted on the shaft 321 and it carries a stud 323 positioned in the T-slot 320. The two studs 322 and 323 are offset slightly as shown in Fig. 22.

When the member 315 is raised as above explained while the parts are in the position of Fig. 22, the lever 304 will not be rocked because its stud 322 is in the vertical portion of the T-shaped slot 320, but the lever 296 will be rocked because its stud 323 is in the horizontal position of the slot. When lever 296 is rocked, it rocks release lever 294 (Fig. 21) to release latch 292 for the "extra 1" segment 290 which then acts on the units order pinion of the register which is in its right hand position.

When the member 315 is in the position of Fig. 24, and when it is raised during a subtraction operation as above explained, the lever 296 will not be rocked because its stud 323 is then in the vertical portion of the T-shaped slot 320. But the lever 304 will be rocked because its stud 322 is in the horizontal section of the slot. This will rock release lever 303 to release the latch 302 for the segment 300 that acts to insert the "extra 1" in the units order of the main register when the latter is in its left hand position.

The lateral position of member 315 is determined by a cam edge 324 (Fig. 22) that engages the stud 287 on the arm 288 of a bell crank lever fixed to the shaft 133 (Fig. 14). It will be recalled that the shaft 133 is rocked in accordance with the automatic conditioning of the machine for calculations in the right or left hand sections. When the machine is conditioned for calculations in the left hand side the shaft 133 is rocked clockwise, as viewed in Fig. 14, which raises stud 287 from its Fig. 22 to its Fig. 24 position. This allows a spring 318 to move the member 315 from its Fig. 22 to its Fig. 24 position. This places member 315 in control of lever 304 which controls the release of the "extra 1" in the units order of the main register in its left hand position.

It follows from this that an "extra 1" is selectively entered in either the units, or the eighth order, depending upon the position of the main register but, in either case, the "extra 1" enters the units order pinion of the main register. The "extra 1" is entered automatically as an incident to a cycle of operation of the machine and the operator need pay no attention to whether the main register is in its right or left hand position because the "extra 1" will be entered selectively and automatically in either position.

As explained for the multiple registers, this "extra 1" is entered during each subtract operation in order that the subtraction may be accurate.

*Negative total signal and lock for main register*

A negative total lock is provided for the main register for locking the rear total key "Bal." to inform the operator when a negative total occurs.

Referring to Fig. 14, the main register has a pinion 20X which occupies the position shown in Fig. 14 even though the main register is in its right hand position. This pinion controls the negative total lock. As shown in Fig. 21, the pinion 20X has a cam 330 fixed to it and this cam has a notch 331 in its periphery. A roller stud 332 on the end of an arm 333 is adapted to enter this notch. The arm 333 controls a stud 334 (Fig. 13) which is adapted to move into the path of a lug 335 in the slidable lock plate 232, the details of the connecting parts being shown in Muller 1,881,852.

When the parts are in normal position, the roller stud 332 occupies the notch 331 and the stud 334 is in the position of Fig. 13 at which time the locking plate 232 is free to move. However, when the pinion 20X is moved away from its "0" position, lever 333 is moved and this moves the stud 334 into the path of lug 335 to block movement of the plate 232 and thus lock the total keys "Bal.", "Cr. Bal.", and "Sub. Bal." The total keys may be released by depressing a release key "Bal. key release" (Fig. 13) which moves the studs 236 and 334 below the lugs 237 and 335 respectively.

The negative total lock must operate when the main register is in either right or left hand position, and provision is made for accomplishing this. Before proceeding with a description of this mechanism it will be well to call to mind the position of the parts with the register in negative condition.

A negative total can occur in a register only when an amount is subtracted from the register. Not every subtracted amount will cause a negative total but, if a negative total occurs, there must have been a subtraction operation to cause it. In the present machine, subtraction is performed by the process of complemental addition involving the adding of "9's" in the higher orders.

When an amount is subtracted which is less than the amount in the register, the addition of the complement of the subtracted item will cause a tens transfer across the register. For example, if the amount in the register is 666 and the amount subtracted is 222, the complement added is 999,999,778. The addition of 778 to 666 causes a tens transfer from the third order to the fourth, which, in turn, causes a tens transfer from the fourth to the fifth, and so on across the register. Accordingly, the pinion 20X of highest order of the register having been moved to its "9" position by the addition of the "9's" in the higher orders, this pinion will be moved to its "0" position under the example assumed.

On the other hand, if the amount subtracted is greater than the amount in the register, a tens transfer will not occur across the register. For example, if the amount in the register is 222, and the amount subtracted is 666, the complement that is added is 999,999,334. The addition of 334 to 222 will not cause a transfer across the register. Accordingly, the pinion 20X of highest order will remain in its "9" position.

Having in mind, therefore, that the negative total lock is controlled by the cam 330 attached to the pinion 20X, it will be evident that, when the amount subtracted is smaller than the amount in the register, the controlling cam will move to its "0" position and the negative total lock will be in its released position. But, if the amount subtracted is greater than the amount in the register, the cam will be in its "9" position and the negative total lock will be effective.

When the main register is in its left hand position shown in Fig. 17, the tens transfer mechanism is operable to cause the tens transfer to the controlling pinion 20X and the negative total lock will operate as above explained.

However, when the main register is in its right hand position shown in Fig. 14, the tens transfer mechanism will not cause a transfer from the register pinion of highest order, i. e., the tenth pinion, to the controlling pinion 20X, as the latter is seven orders separated. It therefore becomes necessary to provide some mechanism for controlling the negative total lock when the main register is in its right hand position.

As mentioned, the main register has ten pinions. In Fig. 21, the tens transfer segment 340 for the tenth pinion is illustrated. When the tenth pinion moves from its "9" to or through its "0" position while the register is in its right-hand position, it moves a pawl 341 counterclockwise as viewed in Fig. 21. Positioned adjacent this pawl is a release latch 342 which, in the present invention, is provided with an extension carrying a stud 343. This stud is positioned in the bifurcated end of an arm 344 of a yoke 345 pivoted on a shaft 346. At its other end this yoke has an abutment nose 347 adapted to be positioned under a latch 348 connected to a toothed segment 349 meshing with the pinion 20X that controls the negative total lock. When the latch 348 is released, the segment 349 moves under the influence of its spring 350 to move the control pinion a step.

With the parts in the position shown in Fig. 21, it is evident that, if the tenth pinion of the register moves from its "9" to or through its "0" position, the pawl 340 will rock yoke 344 which will release latch 348 and permit the segment 349 to enter a unit in the control pinion. In other words a tens transfer to control pinion 20X occurs just as if the tenth register pinion were adjacent pinion 20X.

The tens transfer segment 340 for the tenth pinion operates as a part of the regular tens transfer mechanism between the tenth and eleventh orders of the machine. When the main register is in its left hand position this mechanism must operate for a tens transfer, between the then third and fourth orders of the register without affecting the control pinion 20X.

To provide for this, yoke 345 (Fig. 21) is provided with a forked extension 351 in which one end of the lever 187 is positioned. It will be recalled that this lever 187 is moved automatically when the carriage conditions the machine for operations in either the right or left section. Fig. 21 shows the parts in the position they occupy when the machine is conditioned for operations in the right hand section. When the machine is conditioned for operations in the left hand section, lever 187 is rocked clockwise as viewed in Fig. 21 which slides the yoke 345 along the shaft 346 to move the abutment 347 out of line with the latch 348, so that even though the yoke 345 is rocked it will not release the latch 348. Accordingly, when the machine is conditioned for operation in the left hand position, the above described control for the negative total lock is ineffective and it does not interfere with the tens-transfer action.

It still remains to introduce a "9" into the control pinion 20X because, in subtraction, the correct operation depends upon the pinion of highest order being moved, first, to its "9" position and, then, moved an additional unit depending upon whether the register remains positive or goes negative. Referring to Figs. 14 and 15, it will be observed that the pendant 27X which controls the stop member 30X is offset slightly. It will be recalled that, when the machine is conditioned for subtraction with the main register in its right-hand position, the comb plate 100 is moved to the position of Fig. 16. In this position, when the machine is given a cycle of operation, only those racks whose pendants are in line with the comb plate are blocked. The higher order racks are blocked in Fig. 16 but, because of the offset in pendant 27X, it is not blocked, with the result that the rack 10X for pinion 20X can move forward nine steps to introduce a "9" into the control pinion 20X.

From the above it will be seen that the negative total lock is automatically controlled so that it is effective on both the right and left hand positions of the main register.

*Negative total from main register*

It is possible to take a true negative total from the main register when the latter is in its right hand position. The negative total is taken by a series of transfer operations as follows:

When a negative total occurs, the register contains the complement of the true total. If the register is in its left hand position the total keys are locked and a total cannot be taken. But, with the register in its right hand position, the machine is first conditioned by depression of the "Cr. Reg." and "Bal." keys so that, during the first cycle of operation, it will transfer this complement in the register to the pendants at the rear of the machine. The total in the pendants is then the complement of the true negative total. The main register is thereby cleared. The machine is then conditioned by the subtract key and given a cycle of operation during which "1" less than the complement of the complement in the pendants is transferred additively to the main register by the racks 10 under control of the stop members 30 and an "extra 1" is then added into said main register which then contains the true negative total. The "Bal." key is then depressed and the true negative total taken from this register. Depression of the "Cr. Bal." key will cause all three of the above-described cycles to be performed, one after the other, without interruption.

*Simultaneous addition in main register and any multiple register*

It is possible to simultaneously add an item in the main register and in any one of the forty multiple registers.

In performing simultaneous addition the main register and the indexed multiple register are both rocked into engagement with the actuator racks at the same time, after the racks have been differentially positioned. The result is that, as these racks are returned, the amount that has been indexed on them will be entered in both of the registers.

It will be recalled that two of the multiple registers are indexed at the same time, but, operations are carried forward in only one section of the machine at a time, that is, either the right or left hand section. If the pinions of the main register are in line, order for order, with those of the right hand register, simultaneous addition may be performed as above explained. But, if an amount were added in the left hand register, it will be clear that the same amount would not be added in the main register if the latter were in its right hand position because the pinions of the main register would not be in line, order for order, with the pinions of the left hand register. But, as previously explained, when the machine is conditioned for operations in the right or left hand sections, the main register is automatically moved to a corresponding position so that it can function with the section of the machine that has been conditioned. Thus the main register is always automatically aligned with the multiple register in which operations are being performed.

When the main register occupies its normal Fig. 14 position, the units pinion is in line with the units actuator rack which, of course, is in line with the units pinion of the right hand multiple register that happens to be indexed at the time. With the main register in this position, simultaneous addition may be performed on it and the right hand multiple register. When the machine is conditioned for operation in the right hand section, the rack bars in the left hand section are blocked against movement during an operation of the machine. When the main register is in the position of Fig. 14, the three register pinions of highest order are positioned in line with three of the racks of the left hand section that are blocked. Movement of these three highest order pinions is prevented when the main register is engaged with the racks, but this does not prevent a tens transfer into these pinions because the transfer mechanism is set by the other pinions and then operated to cause the transfer after the register has been rocked out of engagement with the racks. In other words, in simultaneous addition, with the main register in its right hand position, the capacity of the main register is not limited to seven pinions.

When the machine is conditioned for operations in the left hand section, the main register is moved into the position of Fig. 17 where the units order pinion is in line with the eighth rack bar which is in line with the units pinion of the left front register. The rear register is automatically moved to position by mechanism heretofore described. In this position, simultaneous addition may be performed on the main register and any left hand multiple register.

Since the register magazine may be indexed automatically and the machine conditioned automatically for either right or left section operations, it follows that simultaneous addition on the main register and any multiple register may be completely automatic.

*Simultaneous subtraction in the main register and any multiple register*

It is possible to subtract an item from the main register and simultaneously subtract it from any multiple register, that is, from either the right or the left hand multiple register of the two registers that the indexed at a given time.

In any given columnar position of the carriage, the register magazine may be indexed to place any pair of registers in position. Assume, first, that, in such column, the machine is conditioned for operation in the right hand section. This means that an amount indexed on the keys will be entered in the right hand indexing mechanism, the main register will be in right hand position, and the racks will be controlled for operation in the right hand section. After the item is entered on the amount keys, the extend key "Cr. Reg." is depressed. During the first cycle of machine operation the item indexed on the keys will be extended to the pendants at the rear of the machine. Prior to the second cycle of operation both the "front and the rear" subtract key (Fig. 13) will be depressed. This has the effect of conditioning the machine for a subtract operation in the multiple and the main registers, the same as if the individual keys "front subtract" and "rear subtract" had both been depressed. During said second machine cycle, the right hand actuator racks are first indexed to positions determined by the stop members 30. During the latter half of this cycle, both the main register and the right hand indexed register will be rocked into engagement with the racks so that as the latter are returned to normal "1" less than the complement of the indexed item will be added in both the main and the right hand indexed register and the "extra 1" is entered in both registers at the appropriate time, both "extra 1" mechanisms being automatically and selectively controlled for this purpose. This results in subtracting the item from both of these registers simultaneously.

Assume, next, that the machine is conditioned for operations in the left hand section by hand or automatically. The magazine may be indexed to any position for this operation so that any two registers of the forty multiple registers may be selected. After an item is entered on the amount keys, the "Cr. Reg." key is depressed and the machine given a cycle of operation which extends this amount into the pendants at the rear of the machine. Prior to the second cycle of operation the "front subtract" key and the "rear subtract" key, or the "front-rear subtract" key may be depressed. During the first part of the second cycle, the rack bars are differentially positioned by the stop members 30. During the latter half of the cycle both the rear and the selected left multiple register will be rocked into engagement with the actuator racks prior to their return. The "extra 1" is entered automatically as before. Accordingly, the item entered on the keys will be simultaneously subtracted from the main register and from the selected left hand multiple register.

*Total transfer*

It is possible to transfer a total from the main register to certain of the multiple registers and this may occur additively or subtractively, i. e., the total may be added to or subtracted from the selected multiple register.

It is also possible to transfer a total from any one of the multiple registers to the main register and this total may be transferred additively or subtractively, i. e., the total in the selected multiple register can be added to or subtracted from the main register.

In transferring a total from the main register to a selected multiple register, the "Bal." key is depressed with the main register in its right-hand position, which causes the main register to engage the actuator racks before the latter are moved forward. Accordingly, the racks are differentially positioned under the control of the main register. After the racks have been differentially positioned, the selected multiple register is rocked into engagement with them so that, as the racks are returned, the amount previously in the main register is transferred to the selected multiple register. The transfer takes place to the right-hand one of the selected set of multiple registers.

When the transfer is made additively the parts operate as above described, but when it is made subtractively a different operation is involved.

When a total in the main register is to be subtracted from a selected multiple register the "Bal." and "Cr. Reg." keys are depressed and the machine given a cycle of operation. This causes the total to be transferred to the pendants. The "front subt." key is then depressed and the machine given another cycle of operation which causes the actuator racks to be differentially positioned under the control of the pendants. The selected multiple register is then rocked to engagement with the racks, after which the latter are returned. The complement of the total is added into the selected multiple register which, in effect, amounts to subtracting the total from said register. This can be done in either the right or left hand sections of the machine, the various parts being properly controlled automatically, as heretofore explained.

When it is desired to transfer a total from a selected multiple register to the main register, the register magazine is indexed by hand or automatically, and the machine is conditioned for operation in the right or left hand sections, either by hand or automatically. The keys "Front total" and "Dr. Reg." (Fig. 13) the latter of which "adds" the main register, are then depressed and the machine given a cycle of operation. This causes the selected multiple register to be rocked into engagement with the racks before they move forward, with the result that the racks are differentially positioned according to the total in the multiple register. The main register is then rocked into engagement with the racks prior to their return, which causes the amount indexed in the racks to be transferred to the main register. This operation may take place in either the right or left-hand sides of the machines, the parts being properly conditioned automatically, as hereinbefore explained.

When an amount in a multiple register is to be subtracted from the main register the operation is slightly different. The "front total" and the "Cr. Reg." keys are depressed and the machine given a cycle of operation. This causes the amount in the selected multiple register to be transferred to the pendants at the rear of the machine. The "Rear Subt." key is then depressed and the machine given another cycle which causes the actuator racks to be differentially positioned under the control of the pendants. The complement is then added into the main register which results, in effect, in subtracting the total from the main register. This operation may be carried forward in either the right or left hand side of the machine, the various parts being properly controlled automatically, as heretofore explained.

It is also possible to transfer a negative total from the main register to certain selected multiple registers, or from any selected multiple register to the main register. These transfers can occur in either direction. The amount of the negative total may be transferred additively by a series of operations corresponding to a subtractive transfer, that is, the complement of the negative total to be transferred is first transferred to the pendants to the rear of the machine. It is converted to an amount which is "1" less than the complement of the complement, or the true total, and transferred from the pendants to the desired register to which an "extra 1" is also added. The amount of a negative total may be transferred subtractively, that is, the amount of a negative total in the main register may be subtracted from any multiple register, and vice versa, the amount of a negative total in one of the multiple registers may be subtracted from the main register. This is accomplished by causing the register from which the amount of the negative total is to be subtracted to mesh with the racks during the return stroke of the same cycle in which, in the forward stroke, said racks withdraw the complement of the negative total from the register in which the negative total occurred. Thus the amount of the negative total in the one register is subtracted from the other register by adding into the latter the complement of the negative total. The "extra 1" mechanism does not operate in such an operation because the subtract plates are not operated and no "extra 1" is needed because the stop members 30 are not used as the desired complement of the negative total is transferred to the racks 10 directly from the register which contained the negative total.

*Delayed release of carriage controls*

The mechanisms that are controlled automatically have been heretofore described but, for convenience, they will be briefly summarized. When the carriage moves to a predetermined columnar position the following mechanisms are automatically controlled:

The indexing mechanism is controlled so that an amount entered on the keys will be indexed selectively in the right or left hand section of the machine.

The rack bars for the right and left hand sections are automatically and selectively controlled.

The position of the main register is selectively and automatically determined.

The "extra 1" mechanism for the multiple registers is automatically and selectively conditioned.

The "extra 1" mechanism for the main register is selectively and automatically conditioned.

The negative total lock for the main register is selectively and automatically conditioned.

The control of the comb plate by the rear subtract key is varied.

Assume that the carriage has moved to a columnar position where the cam 94 becomes effective. The various mechanisms above described are automatically conditioned for proper operation. Some of the mechanisms of the machine that are specially conditioned do not operate until near the end of a cycle of machine operation. The paper carriage is tabulated from one column to the other near the end of a cycle of operation of the machine. In order to prevent the possibility of the automatic mechanisms being allowed to return to the wrong condition by reason of the movement of the paper carriage, a delayed release mechanism has been provided for holding these mechanisms in correct position until the carriage reaches its next columns.

When the carriage automatically conditions the various mechanisms above explained, the arm 82 (Fig. 3) is moved counterclockwise to its Fig. 8 position where it is latched in position by the latch 120 as heretofore explained. This latch is pivoted at 360 (Fig. 3) and urged clockwise by a spring 361. It carries a stud 362 (Fig. 8) on its upper end positioned under a lug 363 constituting part of an arm 364 (Fig. 11). The arm 364 is pivoted at 365 to a stationary frame plate of the machine. This arm carries a pass-by pawl 366 having a nose 367 adapted to be engaged by a stud 368 on a vertically movable member 369 associated with the tabulating mechanism of the paper carriage. This member constitutes a tabulating stop and the manner in which it operates in connection with the tabulating mechanism is disclosed in Thieme No. 1,259,929, and will be only briefly described here. As shown in Fig. 11, an arm 370 is fixed to a shaft 371 that is rocked near the end of each cycle of operation of the machine. This arm carries a stud 372 on its end adapted to engage a stud 373 on the vertically movable member 369. The arm 370 operates to raise the member 369 near the end of a cycle of machine operation to the dot and dash position of Fig. 11 where it is held by means of the square stud 374 at its upper end which engages the stationary stop lug 375 of the tabulating mechanism. The member 369 remains in its upper position until released by the next tabulating stop.

As the member 369 is moved upward, the stud 368 passes the pass-by pawl 366 without having any effect on the arm 364. But, after the carriage has tabulated, and as the carriage reaches its next columnar position, the member 369 is released, whereupon it is moved downwardly by the spring 376. As it moves downwardly, the stud 368 engages the nose 367 of pawl 366 and rocks the arm 364 clockwise as viewed in Fig. 11. This causes the lug 363 (Fig. 3) to engage the stud 362 on the latch 120 and swing the latch counterclockwise as viewed in Fig. 3 to release the carriage controls which thereupon return to normal under the influence of the springs urging them in that direction.

It will thus be seen that, when the carriage moves to a predetermined column where it conditions the various mechanisms, the carriage controls are latched in position and they are held in this position until the carriage reaches its next columnar position, whereupon these controls are automatically released for return to normal. When the carriage is tabulated during the latter part of a cycle of machine operation, the carriage controls are held in position even though the carriage moves from its position before all the carriage conditioned mechanisms have operated. But, when the carriage reaches its next column the controls will be released so that they can go back to normal for the succeeding cycle of machine operation.

*Manually operable conditioning means*

The description up to this point has been directed primarily to automatic control of the machine, which is the preferred type of control. But it is also possible to condition the machine by hand.

As already mentioned, it is possible to index the register magazine in any desired position either forward or backward by means of manually operable keys on the keyboard.

The machine can be conditioned for operations in the right or left hand sections by moving the hand lever 159 (Fig. 12) which is fixed to the shaft 81. As heretofore described shaft 81 is the shaft whose oscillation controls the oscillation of the shaft 133. It follows that, by moving the lever 159 from one position to the other (Fig. 12), the shaft 81 may be rocked from one position to the other and all the mechanisms that are conditioned by this shaft will be conditioned in the same manner as if the shaft were rocked under the control of the paper carriage. The control of the indexing mechanism by the paper carriage is not through the shaft 81. Instead the paper carriage moves the lever 84 which rocks bell crank 80—82 that is loosely mounted on shaft 81, thereby shifting the plate 65 to control which side of the machine shall be indexed. However, when the shaft 81 is manually rocked counterclockwise by the lever 159, the arm 130 which is fixed to said shaft engages the stud carried by the plate 65 and engaging into the slot in the upper end of the arm 82 and thereby moves the plate 65 to the left.

It follows from this that, by moving the hand lever 159, the machine may be conditioned for operations in the right or left hand section the same as if it had been conditioned automatically under the control of the paper carriage.

I claim:

1. A calculating machine having depressible amount keys, two sets of index pins, means controlled by said amount keys for indexing an amount in said sets of pins, a plate movable to positions to prevent the indexing of either set of pins while leaving the other set free to be indexed, a traveling paper carriage, and means controlled by said paper carriage acting to automatically and selectively position said plate.

2. A calculating machine having a traveling paper carriage, two sets of indexing mechanisms, two groups of actuator racks controlled respectively by said mechanisms and releasable by the general operating means of the machine, means for indexing amounts in said mechanisms, and means acting automatically in predetermined positions of said carriage to determine in which of said indexing mechanisms an amount shall be indexed and to prevent movement of the group of actuator racks corresponding to the mechanism in which the amount is not indexed.

3. A calculating machine of the ten-key type having depressible amount keys, a traveling paper carriage, a traveling pin carriage having two sets of index pins, two groups of actuator racks whose differential positions are determined by the respective sets of indexing pins, means operated by said amount keys for indexing amounts in said index pins, and means controlled by said paper carriage for automatically determining in which of said sets of pins an amount shall be indexed and for automatically preventing movement of the actuator racks corresponding to set that is not indexed.

4. A calculating machine adapted to be given cycles of operation, a traveling paper carriage, two indexing mechanisms, two groups of actuator racks controlled respectively by said mechanisms, means for indexing amounts in both of said indexing mechanisms, means actuated by said paper carriage acting automatically in predetermined columnar positions of said carriage to determine in which of said indexing mechanisms an amount shall be indexed, and means conditioned by said carriage and actuated during a cycle of operation of said machine for preventing movement of the actuator racks corresponding to the indexing mechanism that is not indexed.

5. A calculating machine having amount determining differential mechanism, a plurality of registers, a printing mechanism, means for supporting a work paper, columnar printing control means for controlling the columnar printing on said paper, means for automatically indexing two of said registers at a time with respect to said differential mechanism, and means automatically determining, in accordance with the column in which printing occurs, in which of said indexed registers an amount indexed in said differential mechanism shall be entered.

6. A calculating machine having amount determining differential mechanism, a plurality of registers, means for automatically indexing two of said registers at a time for cooperation with said differential mechanism, a traveling paper carriage, and means controlled by said paper carriage acting, in predetermined columnar positions, to automatically determine in which of said registers an amount shall be entered that is indexed in said differential mechanism.

7. A calculating machine having amount determining differential mechanism, a plurality of multiple registers, means for indexing two of said registers at a time with respect to said differential mechanism, means for selectively determining which of said two indexed registers shall receive an amount entered in said machine, and means automatically indicating which of said indexed registers will receive said amount.

8. A calculating machine having amount determining differential mechanism, a plurality of registers adapted to cooperate with said mechanism, means for indexing two of said registers at a time on a common support, means for conditioning said machine to cause calculations to take place selectively in one of said indexed registers, and means acting automatically to indicate in which of said registers said calculations are performed.

9. A calculating machine having a plurality of registers carried by a movable support having a given number of index positions, means for indexing said support, a plurality of registers carried by said support in excess of the number of index positions of said support whereby, when said support is indexed, more than one register will be indexed, means for causing an amount entered in the machine to be selectively entered in only one of said indexed registers, indicating means for indicating the position of said support, and means automatically controlling said indicating means to cause it to indicate which of the indexed registers has been selected.

10. A calculating machine having a plurality of registers carried by a movable register support having a given number of index positions, means for indexing said support, a plurality of registers carried by said support in excess of the number of index positions of said support whereby, when said support is indexed, more than one register will be indexed, indicating means movable in unison with said support to indicate the position of said support, means for selectively conditioning said machine to perform calculations in one of the indexed registers, and a mask associated with said indexing means automatically positioned in accordance with the conditioning of said machine to automatically indicate which of the indexed registers has been selected.

11. A calculating machine having a plurality of multiple registers, means for indexing two of said registers at a time, a printing mechanism, means for supporting a work sheet, columnar printing control means for controlling the columnar printing on said sheet, means controlled automatically in accordance with the column in which printing occurs for determining which of said two indexed registers shall receive an amount entered in the machine, and an indicating means automatically controlled in accordance with the column in which printing occurs for indicating in which of said indexed registers the amount is entered.

12. A calculating machine having amount determining differential mechanism, a plurality of permanently structurally paired multiple registers, means for indexing said pairs of registers for active cooperation with said differential mechanism, and means for conditioning portions of said machine to cause it to perform on either register of the indexed pair the calculation for which the machine is conditioned.

13. A calculating machine having amount determining differential mechanism, a plurality of permanently structurally paired registers, a common support for each pair of registers, means for indexing said pairs of registers so that both registers of an indexed pair are adapted to engage said differential mechanism at the same time, and means for conditioning portions of said machine to cause it to perform on either register of the indexed pair the calculation for which the machine is conditioned when both of said registers engage said differential mechanism.

14. A calculating machine having amount determining differential mechanisms, a plurality of permanently structurally paired registers adapted to cooperate with said mechanism, means for indexing said pairs of registers with respect to said mechanism, a printing mechanism, means for supporting a work sheet, columnar printing control means for controlling the columnar printing on said sheet, and means conditioned automatically in accordance with the column in which printing occurs to cause calculations to be selectively performed in one of the registers of the indexed pair while both are conditioned for cooperation with said differential mechanism.

15. A calculating machine having a traveling paper carriage, amount determining differential mechanism, a plurality of permanently structurally paired registers, means for indexing said pairs of registers for active cooperation with said differential mechanism, and means controlled by said paper carriage acting in predetermined columnar positions to automatically condition portions of said machine to cause it to perform on either register of the indexed pair the calculation for which the machine is conditioned.

16. A calculating machine having amount determining differential mechanism including actuator racks, two registers constructed and arranged to engage said racks simultaneously, one register engaging one group of said racks and the other register engaging another group, means for conditioning portions of said machine to enable items to be subtracted from said registers by a process of complemental addition involving the movement to their "9" position of the actuator racks in the orders above those in which an amount has been indexed, means for conditioning portions of said machine to selectively subtract an item from either register, and means automatically controlling said actuator racks in accordance with the selection of the registers to prevent movement to their "9" positions of the racks corresponding to the register that is not selected.

17. A calculating machine having amount determining mechanism including actuator racks, a traveling paper carriage, two registers constructed and arranged to engage said racks simultaneously, one of said registers engaging one group of said racks and another register engaging another group, means for conditioning portions of said machine to enable subtraction to be performed in either register by a process of complemental addition involving the movement to their "9" positions of the racks above an amount indexed, means acting automatically in accordance with the columnar position of said carriage to selectively condition portions of said machine for operations in either register, and means acting automatically, in accordance with the register selected, for controlling said racks to prevent movement to their "9" positions of the racks in the orders corresponding to the register in which no operations are performed.

18. A calculating machine having amount determining differential mechanism, a plurality of multiple registers, means for indexing two of said registers at a time for simultaneous cooperation with said differential mechanism, total-taking control means for conditioning portions of said machine to enable totals to be taken from said indexed registers, and means for conditioning said machine to enable said total-taking control means to cause a total to be selectively taken from either of said indexed registers while both are conditioned for cooperation with said differential mechanism.

19. A calculating machine having amount determining differential mechanism, a printing mechanism, means supporting a work sheet, columnar-printing control means for controlling the columnar printing on said sheet, a plurality of multiple registers, means for indexing two of said registers at a time for simultaneous cooperation with said differential mechanism, total-taking control means for conditioning portions of said machine to enable totals to be taken from said indexed registers, and means operating automatically in accordance with the column in which printing occurs to selectively condition said machine to enable said total-taking control means to take a total from either of said indexed registers while both are conditioned for cooperation with said differential mechanism.

20. A calculating machine having a traveling paper carriage, amount determining differential mechanism, a plurality of multiple registers, means for indexing two of said registers at a time for simultaneous cooperation with said differential mechanism, total taking control means for conditioning portions of said machine to enable totals to be taken from said indexed registers, and means acting automatically in predetermined columnar positions of said carriage for selectively conditioning said machine to enable a total to be taken from either of said indexed registers while both cooperate with said differential mechanism.

21. A calculating machine having amount determining differential mechanism, a traveling paper carriage, a plurality of multiple registers, means for indexing two of said registers at a time, said two registers comprising right and left hand groups of pinions on a common support which causes both of said registers to engage said differential mechanism simultaneously, total-taking control means for conditioning portions of said machine to enable totals to be taken from said register pinions, and means controlled by said carriage acting automatically in a predetermined columnar position to selectively condition said machine to enable a total to be taken from either register without disturbing the other.

22. A calculating machine having amount determining differential mechanism, a plurality of registers, means movable to a plurality of positions for selecting different ones of said registers for operation, subtraction control means, means controlled by said subtraction control means for controlling said differential mechanism to add in the selected register an amount differing by a predetermined amount from the complement of the amount to be subtracted, mechanism operable to enter said predetermined amount in either register, and means controlled by said register selecting means and by said subtraction control means to selectively determine in which of said registers said last-named mechanism shall enter said predetermined amount.

23. A calculating machine having a traveling paper carriage, amount determining differential mechanism, a plurality of registers, register selecting means controlled by said carriage, subtraction control means, means controlled by said subtraction control means for controlling said differential mechanism to add in the selected register an amount differing by a predetermined amount from the complement of the amount to be subtracted, mechanism operable to enter said predetermined amount in either register, and means controlled by said subtraction control means and automatically in accordance with the columnar position of said carriage acting to selectively determine in which register said last-named mechanism shall enter said predetermined amount.

24. A calculating machine having a traveling paper carriage, amount determining differential mechanism, two registers comprising two groups of pinions mounted co-axially on a common support, means controlled by said carriage for determining in which of said groups of pinions calculating operations shall be performed, subtraction control means, means controlled by said subtraction control means for controlling said differential mechanism to add in the selected register "1" less than the complement of the amount to be subtracted, mechanism for adding an "extra 1" in the units order of either group of pinions, and means controlled by said subtraction control means and automatically in accordance with the columnar position of said carriage for selectively determining in which of said groups of pinions said "extra 1" shall be entered.

25. A calculating machine having amount determining differential mechanism, a plurality of multiple registers each capable of addition or subtraction whereby each may reach a positive or negative condition, means for selectively indexing said registers with respect to said differential mechanism, and means acting automatically, at the time each register is indexed and before calculation operations are performed in it, to indicate to the operator whether the total in the indexed register is positive or negative.

26. A calculating machine having amount determining differential mechanism, a plurality of registers each of which is capable of addition or subtraction whereby each may reach a positive or negative condition, means for indexing two of said registers at a time with respect to said differential mechanism, means for selectively conditioning said machine to perform operations in either of said indexed registers, and means acting automatically to indicate whether a total that may be in the indexed register in which operations are to be performed is positive or negative.

27. A calculating machine having amount determining differential mechanism, a plurality of multiple registers carried by a movable register support, each of said registers being capable of addition or subtraction whereby each may reach a positive or negative condition, means for indexing said support to selectively index said registers, and means operating automatically when said support is indexed for indicating whether the total in the register that is indexed is positive or negative.

28. A calculating machine having amount determining differential mechanism, a plurality of multiple registers carried by a movable register support, each of said registers being capable of addition or subtraction whereby each may reach a positive or negative condition, means for indexing said register support, means for removing the indexed register from said support to a position for cooperation with said differential mechanism, and means automatically operating to indicate, prior to the removal of an indexed register from said support, whether the total in said register is positive or negative.

29. A calculating machine having amount determining differential mechanism, a plurality of multiple registers carried by a movable register support, each of said registers being capable of addition or subtraction whereby each may reach a positive or a negative condition, means for indexing said register support to index a register, means for moving the indexed register relative to said support to a position for cooperation with said differential mechanism and for returning said register to normal position on said support after calculating operations have been performed, and means operating automatically, when said register is returned to said support, to indicate whether the calculations performed have produced a positive or a negative total on said register.

30. A calculating machine having amount determining differential mechanism, a plurality of multiple registers capable of addition or subtraction whereby each may reach a positive or a negative condition, means for selectively indexing said registers with respect to said differential mechanism, a total taking control means for conditioning portions of said machine for taking a total from the register that has been indexed, and means acting automatically to lock said total taking control means when a register is indexed for operation with a negative total in said register.

31. A calculating machine having amount determining differential mechanism, a plurality of multiple registers capable of addition or subtraction whereby each may reach a positive or a negative condition, means for selectively indexing said registers with respect to said differential mechanism to enable calculating operations to be performed on a given register, said register indexing means being capable of moving said register away from indexed position while it contains a total, and means acting automatically, when said register is returned to indexed position, for indicating to the operator whether the total in the register is positive or negative.

32. A calculating machine having amount determining differential mechanism, a plurality of multiple registers carried by a movable register support, each of said registers being capable of addition or subtraction whereby each may reach a positive or a negative condition, means for indexing said register support, and means acting automatically as said register support is moved to bring a given register to indexed position for indicating whether the total in the register that is indexed is positive or negative.

33. A calculating machine having amount determining differential mechanism, a plurality of registers carried by a movable support, means for indexing said support to selectively bring said registers to active position relative to said differential mechanism, each of said registers being capable of addition and subtraction when in active position whereby each may reach a positive or negative condition, each of said registers being movable away from active position while containing a negative total but being returnable to active position upon re-indexing said register support, and total-taking control means operable to condition portions of said machine to take a true negative total from each of said registers when it is re-indexed.

34. A calculating machine having amount determining differential mechanism, a plurality of multiple registers contained in a movable magazine, means for indexing said magazine to selectively bring the registers to indexed position, means for moving the indexed register from said magazine to operating position relative to said differential mechanism, each of said registers being capable of addition or subtraction when in operating position whereby each may reach a positive or negative condition, means for returning said registers to said magazine when in either negative or positive condition, said indexing means enabling each register to be again indexed so as to be movable to position for co-operation with said differential mechanism, and means for taking a true negative total from any indexed multiple register.

35. A calculating machine having amount determining differential mechanism, a traveling paper carriage, two registers, a common support movable to carry said two registers simultaneously into and out of engagement with said differential mechanism, each of said registers being capable of addition and subtraction whereby either may reach a positive or a negative condition, total-taking control means for conditioning portions of said machine to enable totals to be taken from said registers, and means acting automatically when said paper carriage reaches a predetermined position to condition portions of said machine to enable a true negative total to be selectively taken from either of said registers while both engage said differential mechanism.

36. A calculating machine having amount determining differential mechanism, a plurality of multiple registers each of which is capable of addition and subtraction whereby each may reach a positive or negative condition, means for indexing two of said registers at a time with respect to said differential mechanism, total-taking control means for conditioning portions of said machine to enable totals to be taken from said registers, and means for conditioning said machine to enable said total-taking control means to condition portions of said machine to selectively take a true negative total from either of said indexed registers.

37. A calculating machine having amount determining differential mechanism including a plurality of actuator racks divided into two groups, a register, said register and racks being mounted to enable a relative movement to occur between them so that said register may selectively operate with either group of racks, means for selectively determining which of said group of racks shall be differentially positioned by the entry of an item in said machine, and means operating automatically to change the relative position of said register and racks in accordance with which group of racks is selected.

38. A calculating machine having two indexing mechanisms, means operable to index items in either of said indexing mechanisms, a plurality of actuator racks divided into two groups, said groups of racks being adapted to be differentially positioned under the respective control of said indexing mechanisms, a register movable laterally relative to said racks to positions where the register may operate with either of said groups, means for selectively determining which of said indexing mechanisms shall be indexed when an amount is entered in said machine, and means for automatically moving said register laterally in accordance with the selection of said indexing mechanisms.

39. A calculating machine having a printing mechanism, paper supporting means, column printing control means for controlling the column in which printing shall occur on said paper, amount determining differential mechanism divided into two sections, a register, said register and differential mechanism being relatively movable to enable said register to operate selectively with either section of said differential mechanism, means operating automatically in accordance with the column in which printing occurs to selectively determine in which section of said differential mechanism an amount entered in said machine shall be indexed, and means acting automatically to change the relative position of said register and differential mechanism in accordance with which section of said mechanism is indexed.

40. A calculating machine having a traveling paper carriage, amount determining differential mechanism divided into two sections, a register, said register and differential mechanism being relatively movable to enable said register to selectively operate with either section of said differential mechanism, means controlled by said paper carriage for automatically determining in which section of said mechanism an item entered in said machine shall be indexed, and means controlled by said paper carriage for automatically changing the relative position of said register and differential mechanism in accordance with which section of said mechanism is indexed.

41. A calculating machine having a traveling paper carriage, two indexing mechanisms, means for indexing items in either of said mechanisms, a plurality of actuator racks divided into two groups, said groups being adapted to be differentially positioned by their respective indexing mechanisms, a register movable laterally with respect to said racks so that it may selectively operate with either group, means controlled by said paper carriage for automatically selecting said indexing mechanisms for indexing an item, and means controlled by said carriage automatically moving said register relative to said racks in accordance with the indexing mechanism selected.

42. A calculating machine having amount determining differential mechanism divided into two sections, a register movable from one position where it may operate with one section of said differential mechanism to perform calculations to a second position where it may operate with the second section, means for selectively moving said register to said position, means for conditioning portions of said machine for operations in either section of said differential mechanism, total-taking control means for conditioning portions of said machine for taking a total from said register, and means operating automatically to lock said total-taking control means when said machine is conditioned for calculations in said second section.

43. A calculating machine having a traveling paper carriage, amount determining differential mechanism divided into two sections, a register, means for moving said register from one position where it may cooperate with one section of said differential mechanism to perform calculations to another position where it may cooperate with the second section to perform calculations, means for selectively conditioning portions of said machine for calculations in either section of said differential mechanism, a total-taking control means for conditioning portions of said machine to enable totals to be taken, and means controlled by said paper carriage for automatically locking said total-taking control means when said register is in position to cooperate with said second section of said differential mechanism.

44. A calculating machine having amount determining differential mechanisms divided into two sections, means for conditioning said machine to enable either section to be used for calculations and for preventing movement of the section that is not used, a register movable relative to said differential mechanism to selectively position it for cooperation with either section, said register being of such capacity that when engagement between it and the differential mechanism is caused, said register will engage one section of said mechanism and a portion of the other section that is normally prevented from moving, total-taking control means for conditioning portions of said machine for total taking, and means automatically conditioned in accordance with the position of said register when the machine is conditioned for taking a total for releasing certain portions of the section of said differential mechanism that is normally prevented from moving whereby a total may be taken to the full capacity of said register.

45. A calculating machine having amount determining differential mechanism including two groups of actuator racks, a register having a plurality of pinions in excess of the number of racks of one group, means for relatively moving said register and racks so that an engagement may be caused between said register and either of said groups of racks, means for conditioning said machine to perform subtraction by a process of complemental addition wherein the higher order racks above the amount indexed are released for movement to their "9" positions, mechanism operating automatically to insert "1" in the units order of said register in either of the relative positions of said register and groups of racks, and means operating automatically in accordance with the relative position of said register and groups of racks for controlling said racks and said "1" inserting mechanism to enable subtraction to be performed when an engagement is caused between said register and either group of racks.

46. A calculating machine having amount determining differential mechanism including two groups of actuator racks, a register having a plurality of pinions of greater number than either group of said racks, means for relatively positioning said register and racks so that an engagement may be caused between said register and either of said groups of racks, means normally preventing movement of the group of racks with respect to which the register is not positioned, means for conditioning the machine to perform subtraction by a process of complemental addition wherein the higher order racks above the amount indexed are to be released for movement to their "9" positions, and means acting automatically as an incident to the conditioning of the machine for subtraction for releasing for movement to "9" position the racks in the group with which the register is to engage and predetermined ones in the group that is normally prevented from moving whereby subtraction may be performed for the full capacity of said register.

47. A calculating machine having a traveling paper carriage, amount determining differential mechanism including two groups of actuator racks, a register having a plurality of pinions in excess of the number of racks of one group, said register being selectively movable to positions for cooperation with either group, means for conditioning the machine to perform subtraction by a process of complemental addition wherein the higher order racks of a given group are released for movement to their "9" positions, mechanism operable to automatically insert "1" in the units order of said register in either of its positions, control means for controlling the movement of said actuator racks, means operating automatically in predetermined columnar positions of said carriage to selectively move the register to positions for cooperation with said groups of racks, and means operating automatically in said predetermined columnar positions of said carriage to control said "1" inserting mechanism and said rack controlling means to enable an item to be correctly subtracted from said register when the latter is in either of its selected positions.

48. A calculating machine having a traveling paper carriage, amount determining differential mechanism divided into two sections, a register movable to one position to cooperate with one section to perform calculations and to a second position to cooperate with the other section to perform calculations, means conditioned automatically in predetermined columnar positions of said carriage to selectively condition said machine for calculations in either section, subtraction conditioning means for conditioning portions of said machine to perform subtraction, means conditioned by said subtraction means to modify the carriage control of said sections, and means controlled by said carriage controlled means for disabling said modifying means when one of said sections is conditioned for operation.

49. A calculating machine having a traveling paper carriage, amount determining differential mechanism including actuator racks divided into two groups, a register movable laterally to one position to cooperate with one group of racks to perform calculations and to a second position to cooperate with the other group of said racks to perform calculations, means controlled by said paper carriage for selectively conditioning said groups of racks for operation, a subtraction key and connection for conditioning portions of said machine to perform subtraction, modifying means controlled by said subtraction key for modifying the control of said groups by said carriage, and means controlled by said paper carriage for disabling said modifying means when one of said groups is conditioned for operation.

50. A calculating machine having amount determining differential mechanism, a register constructed and arranged to occupy two different positions with respect to said mechanism in each of which addition or subtraction may be performed on said register, mechanism for inserting "1" in the units order of said register, and means controlling said "1" inserting mechanism automatically in accordance with the position of the register to condition said last named mechanism to insert "1" in the units order of said register in either position of the latter.

51. A calculating machine having amount determining differential mechanism including a plurality or orders of actuator racks, a register adapted to occupy one position in which its units pinion is adapted to engage the units rack and to occupy another position in which its units pinion is adapted to engage a rack of predetermined higher order, means for moving said register from one position to the other, mechanism operable to automatically insert "1" in the units order pinion of said register, and means operating automatically as an incident to the movement of the register to its respective positions for controlling said "1" inserting mechanism to enable the latter to insert "1" in the units order pinion in either position of the register.

52. A calculating machine having a traveling paper carriage, amount determining differential mechanism, a register adapted to occupy two positions with respect to said mechanism in each of which addition or subtraction may be performed, means controlled by said carriage for automatically and selectively moving said register to its positions, mechanism for inserting "1" in the units order of said register, and means controlled by said carriage acting to automatically control said "1" inserting mechanism to condition the latter to insert "1" in the units order of the register in either position of the latter selectively.

53. A calculating machine having a printing mechanism, paper supporting means, column control means for causing the printing to occur in predetermined columns on said paper, amount determining differential mechanism, a register adapted to occupy two positions with respect to said differential mechanism in each of which addition or subtraction may be performed, means acting automatically in accordance with the column in which printing occurs to selectively determine the position of said register relative to said differential mechanism, mechanism for inserting "1" in the units order of said register, and means acting automatically in accordance with the column in which printing occurs to control said "1" inserting mechanism to condition the latter to insert "1" in the units order pinion of said register in either position of the latter.

54. A calculating machine having amount determining differential mechanism, a register constructed and arranged to occupy two positions with respect to said mechanism in each of which either addition or subtraction may be performed whereby, when items are entered in said register, it may reach a positive or negative condition, a negative total lock for locking a portion of the machine when said register goes negative, and means operating automatically to condition said negative total lock in accordance with the position of said register so that it will be selectively effective in either position of the latter.

55. A calculating machine having amount determining differential mechanism including plurality of orders of actuator racks, a register constructed and arranged to occupy two positions with respect to said racks in one of which the units register pinion is adapted to cooperate with a units rack and in another of which the units register pinion is adapted to cooperate with a rack of higher order, said register being capable of addition and subtraction in each of said positions whereby, when items are entered in said register, it may reach a positive or negative condition, a negative total lock controlled by the pinion of highest order of said register, and means automatically conditioning said negative total lock in accordance with the position of said register to render it selectively effective in either of said register positions.

56. A calculating machine having a printing mechanism, paper supporting means, columnar printing control means for causing the printing to occur in different columns on said paper, amount determining differential mechanism, a register constructed and arranged to occupy two different positions with respect to said differential mechanism in each of which either addition or subtraction may be performed when items are entered in said register whereby said register may reach a positive or negative condition, negative total locking mechanism operable to lock a portion of said machine when said register goes negative, means automatically positioning said register in accordance with the column in which printing occurs, and means automatically conditioning said negative total lock mechanism in accordance with the column in which printing occurs to condition said locking mechanism to be selectively operable in either position of said register.

57. A calculating machine having a traveling paper carriage, amount determining differential mechanism, a register adapted to occupy two positions with respect to said mechanism in both of which addition or subtraction may be performed whereby said register may reach a positive or negative condition, means for conditioning said machine for subtraction, a negative total lock for locking a portion of said machine when said register goes negative, and means controlled by said paper carriage and said subtraction conditioning means for conditioning said negative total lock to make it selectively operable in either of the positions of said register.

58. A calculating machine having amount determining differential mechanism, a plurality of multiple registers, means for indexing two of said registers at a time, means for selectively determining in which of said two indexed registers calculation shall be performed, a main register, and means automatically moving said main register, in accordance with the selection of one of said two registers, to a position to perform calculations simultaneously with said selected multiple register.

59. A calculating machine having amount determining differential mechanism including actuator racks, two registers, means for causing an engagement between one of said registers and certain of said racks and between the other of said registers and certain others of said racks, a main register, means for causing an engagement between said main register and certain of said racks, means for conditioning portions of said machine to cause calculating operations to be performed in one of said two registers but not in the other, and means acting automatically, as an incident to said conditioning of portions of said machine, to control said main register so that the same will be operated by the group of racks corresponding to the one of the two registers that has been selected.

60. A calculating machine having amount determining differential mechanism including actuator racks, two registers, means for causing an engagement between one of said registers and a certain group of said racks and between the other of said registers and another group of said racks, a main register movable to positions to cooperate with either group of racks, means for conditioning portions of the machine for calculations in one of said two registers but not in the other, and means acting automatically as an incident to said conditioning of portions of said machine to move said main register to a position to cooperate with the group of racks corresponding to the register in which the calculations are performed.

61. A calculating machine having a printing mechanism, paper supporting means, column printing control means for controlling the column on said paper in which printing occurs, amount determining differential mechanism including actuator racks, two registers, means for causing an engagement between one of said registers and a certain group of said racks and between the other of said registers and another group of said racks, a main register adapted to engage either group of racks, means acting automatically in accordance with the column in which the printing occurs for causing calculations to be entered in one of said two registers but not in the other, and means also acting automatically in accordance with the column in which printing occurs to control the engagement between said main register and racks so that engagement will be with the group of racks corresponding to the one of the two registers in which the calculations are performed.

62. A calculating machine having a traveling paper carriage, amount determining differential mechanism including actuator racks, two registers, means for causing an engagement between one of said registers and a certain group of said racks and between the other of said registers and another group of said racks, a main register adapted for engagement with either group of racks, means controlled by said paper carriage for automatically conditioning portions of said machine to cause calculations to be entered in one of said two registers and not in the other, and means controlled by said paper carriage acting automatically to control the engagement between said main register and racks so that said engagement will be between said register and the group of racks corresponding to the one of the two registers in which the calculations are performed.

63. A calculating machine having amount determining differential mechanism including actuator racks, two registers arranged end to end, means for causing an engagement between said registers and racks, means for conditioning portions of said machine so that calculations will be performed in one of said registers but not in the other, a main register adapted to engage said racks, said main register being movable so that it can be positioned to engage either group of racks, and means acting automatically as an incident to the conditioning of said machine for calculations in either of said two registers for causing said main register to be moved to a position for cooperation with a group of racks corresponding to the one of two registers in which the calculations are performed.

64. A calculating machine having a traveling paper carriage, amount determining differential mechanism, a plurality of front registers, means for indexing two of said registers at a time so that one occupies a right and the other a left hand position with respect to said differential mechanism, a main register adapted to occupy a right or left hand position so as to be operable simultaneously with either of the indexed front registers, mechanism operable to enter "1" in the units pinion of either of the indexed front registers, mechanism for entering "1" in the units pinion of the main register, control means for controlling the differential mechanism to condition the machine to perform subtraction by a process of complemental addition involving release of the differential mechanism in a higher order for movement to "9" positions, and carriage controlled means acting in a predetermined position of said carriage to selectively condition portions of said machine for subtracting an item in either of said indexed front registers, said carriage controlled means having a portion controlling the "1" inserting mechanism for the front register to cause "1" to be introduced into the selected front register and another portion for controlling the "1" inserting mechanism of the main register to cause "1" to be entered in the units pinion of said register in either position of the latter, and other portions controlling the differential mechanism to enable subtraction operations to be correctly performed in the selected front register and the main register.

65. A calculating machine having two sets of indexing pins, a single set of amount keys with associated mechanism for indexing amounts in either of said sets of pins, a group of actuators adapted to be differentially positioned under the control of said sets of pins, said group of actuators being normally released by the general operating means of said machine during a machine cycle for movement to differential positions, printing means, columnar-printing control means for controlling the column in which printing occurs on record material supported in said machine, and means controlled automatically in accordance with the column in which printing occurs for selectively determining in which of said sets of pins an amount entered on said amount keys shall be indexed and for preventing movement of the actuators corresponding to the set of pins in which the amount is not indexed.

66. A calculating machine having amount-determining differential mechanism, a plurality of multiple registers, each of said registers being capable of addition or subtraction whereby, when items are entered in said register, each may reach a positive or negative condition, means for selectively indexing said multiple registers relative to said amount-determining differential mechanism, a tens-transfer mechanism operable with respect to each register when it is indexed and when it is active with respect to said differential mechanism, an extra "1" mechanism operable to insert an extra "1" at the appropriate time in the active indexed register, and total taking conditioning means operable to condition portions of said machine to enable a true negative total to be taken from the active indexed register when such total exists therein.

ROBERT L. MULLER.